United States Patent
Katar et al.

(10) Patent No.: US 9,130,658 B2
(45) Date of Patent: *Sep. 8, 2015

(54) SELECTION DIVERSITY IN A POWERLINE COMMUNICATION SYSTEM

(71) Applicant: QUALCOMM Incorporated, San Diego, CA (US)

(72) Inventors: Srinivas Katar, Gainesville, FL (US); Hao Zhu, Ocala, FL (US); Lawrence Winston Yonge, III, Summerfield, FL (US); Manjunath Anandarama Krishnam, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 13/888,160

(22) Filed: May 6, 2013

(65) Prior Publication Data

US 2014/0328416 A1 Nov. 6, 2014

(51) Int. Cl.
*H04J 15/00* (2006.01)
*H04B 3/54* (2006.01)
(Continued)

(52) U.S. Cl.
CPC .................. *H04B 3/54* (2013.01); *H04B 3/544* (2013.01); *H04B 7/12* (2013.01); *H04L 45/123* (2013.01); *H04B 2203/5445* (2013.01); *H04B 2203/5466* (2013.01); *H04B 2203/5495* (2013.01)

(58) Field of Classification Search
CPC ............ H04B 3/54; H04B 7/12; H04B 3/544; H04L 45/123
USPC .......... 375/257; 370/463, 464, 465, 459, 461, 370/462, 252
See application file for complete search history.

(56) References Cited

U.S. PATENT DOCUMENTS

| 7,406,536 B2 | 7/2008 | Efrati et al. |
| 7,551,907 B2 | 6/2009 | French et al. |

(Continued)

FOREIGN PATENT DOCUMENTS

| EP | 1643658 | 4/2006 |
| EP | 1763146 | 3/2007 |

(Continued)

OTHER PUBLICATIONS

U.S. Appl. No. 61/369,553, filed on Jul. 30, 2010.*

(Continued)

*Primary Examiner* — Chuong T Ho
(74) *Attorney, Agent, or Firm* — DeLizio Law, PLLC

(57) ABSTRACT

A network device can be configured to dynamically adapt its current primary receiver coupling to channel conditions. For each of a plurality of transmitting network devices, the network device can determine a potential primary receiver coupling of the first network device for receiving communications from the transmitting network device based, at least in part, on a performance measurement associated with each of the plurality of communication channels between the network device and the transmitting device. The network device can select its current primary receiver coupling based, at least in part, on the potential primary receiver couplings determined for the plurality of transmitting network devices. In addition, the network device can also determine how to communicate with a receiving network device based, at least in part, on a preferred communication channel between the two network devices and a current primary receiver coupling of the receiving network device.

37 Claims, 8 Drawing Sheets

(51) Int. Cl.
*H04B 7/12* (2006.01)
*H04L 12/721* (2013.01)

(56) References Cited

U.S. PATENT DOCUMENTS

| | | | |
|---|---|---|---|
| 7,577,240 B2 | 8/2009 | Goodman | |
| 7,684,502 B2 | 3/2010 | Kurobe et al. | |
| 7,697,504 B2 * | 4/2010 | Chari et al. | 370/351 |
| 7,702,085 B2 | 4/2010 | Zumkeller et al. | |
| 7,804,917 B2 | 9/2010 | French et al. | |
| 7,856,032 B2 | 12/2010 | Berkman | |
| 7,953,105 B2 | 5/2011 | Kurobe et al. | |
| 8,036,186 B2 * | 10/2011 | Gupta et al. | 370/338 |
| 8,149,703 B2 | 4/2012 | Kostoff et al. | |
| 8,275,344 B2 | 9/2012 | Schwager | |
| 8,325,728 B2 | 12/2012 | Zeppetelle et al. | |
| 8,520,696 B1 * | 8/2013 | Corral et al. | 370/463 |
| 2006/0073805 A1 * | 4/2006 | Zumkeller et al. | 455/402 |
| 2006/0114881 A1 * | 6/2006 | Chari et al. | 370/351 |
| 2006/0268705 A1 | 11/2006 | Kurobe et al. | |
| 2007/0253394 A1 | 11/2007 | Horiguchi et al. | |
| 2007/0274199 A1 * | 11/2007 | Logvinov et al. | 370/203 |
| 2008/0025269 A1 * | 1/2008 | Gupta et al. | 370/338 |
| 2008/0057866 A1 | 3/2008 | Schwager et al. | |
| 2008/0260010 A1 * | 10/2008 | Schwager et al. | 375/222 |
| 2008/0273613 A1 | 11/2008 | Kol | |
| 2008/0298382 A1 | 12/2008 | Galli et al. | |
| 2009/0060060 A1 | 3/2009 | Stadelmeier et al. | |
| 2010/0061433 A1 | 3/2010 | Stadelmeier et al. | |
| 2011/0051786 A1 | 3/2011 | Schwager et al. | |
| 2011/0110408 A1 | 5/2011 | Schwager et al. | |
| 2011/0116555 A1 | 5/2011 | Schwager et al. | |
| 2011/0129007 A1 | 6/2011 | Schwager et al. | |
| 2011/0176598 A1 | 7/2011 | Kohout et al. | |
| 2011/0267956 A1 | 11/2011 | Yonge, III | |
| 2012/0026908 A1 | 2/2012 | Tzannes et al. | |
| 2012/0093240 A1 * | 4/2012 | McFarland et al. | 375/257 |
| 2012/0163436 A1 | 6/2012 | Stadelmeier et al. | |
| 2012/0177132 A1 * | 7/2012 | Reuven et al. | 375/257 |
| 2012/0189042 A1 * | 7/2012 | Varadarajan et al. | 375/222 |
| 2012/0236870 A1 | 9/2012 | Klein | |
| 2012/0307917 A1 | 12/2012 | Goldhamer | |
| 2013/0243052 A1 * | 9/2013 | Barnickel et al. | 375/219 |

FOREIGN PATENT DOCUMENTS

| | | |
|---|---|---|
| EP | 1858174 | 11/2007 |
| EP | 2028769 | 2/2009 |
| EP | 2061160 | 5/2009 |
| EP | 2073471 | 6/2009 |
| EP | 2154789 | 2/2010 |
| EP | 2157704 | 2/2010 |
| WO | 2008135982 | 11/2008 |
| WO | 2009024249 | 2/2009 |
| WO | 2009056181 | 5/2009 |
| WO | 2011001430 | 1/2011 |

OTHER PUBLICATIONS

International Application No. PCT/US2014/037017, International Search Report and Written Opinion, Aug. 4, 2014, 10 pages.

Co-Pending U.S. Appl. No. 12/913,414, filed on Oct. 27, 2010, 49 pages.

"U.S. Appl. No. 12/913,414 Office Action", Dec. 24, 2012, 20 pages.

* cited by examiner

SELECTION DIVERSITY IN A POWERLINE COMMUNICATION SYSTEM

BACKGROUND

Embodiments of the inventive subject matter generally relate to the field of communication networks and, more particularly, to exploiting selection diversity in a powerline communication (PLC) system.

Electric power lines are typically used for distributing electric power to buildings and other structures. Besides providing electric power, the electric power lines can also be used to implement broadband over powerline communications via the wired powerline communication network within the buildings and other structures. Powerline communication provides a means for networking electronic devices (e.g., consumer electronics, smart appliances, etc.) together and also for connecting the electronic devices to the Internet. To facilitate powerline communication, a modulated carrier signal is typically impressed on the electric power line. Depending on the type of data to be transmitted, powerline communication standards, and capabilities of the electric power line, different frequency bands may be used to transmit the data over the powerline network.

SUMMARY

Various embodiments for exploiting selection diversity in a powerline communication system are disclosed. In one embodiment, for each of a plurality of transmitting network devices of a communication network, a first network device of a communication network determines a performance measurement associated with a plurality of communication channels between the first network device and the transmitting network device. For each of the plurality of transmitting network devices, the first network device determines a potential primary receiver coupling of the first network device for receiving communications from the transmitting network device based, at least in part, on the performance measurement associated with the plurality of communication channels. The current primary receiver coupling for the first network device is selected based, at least in part, on the potential primary receiver couplings determined for the plurality of transmitting network devices.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
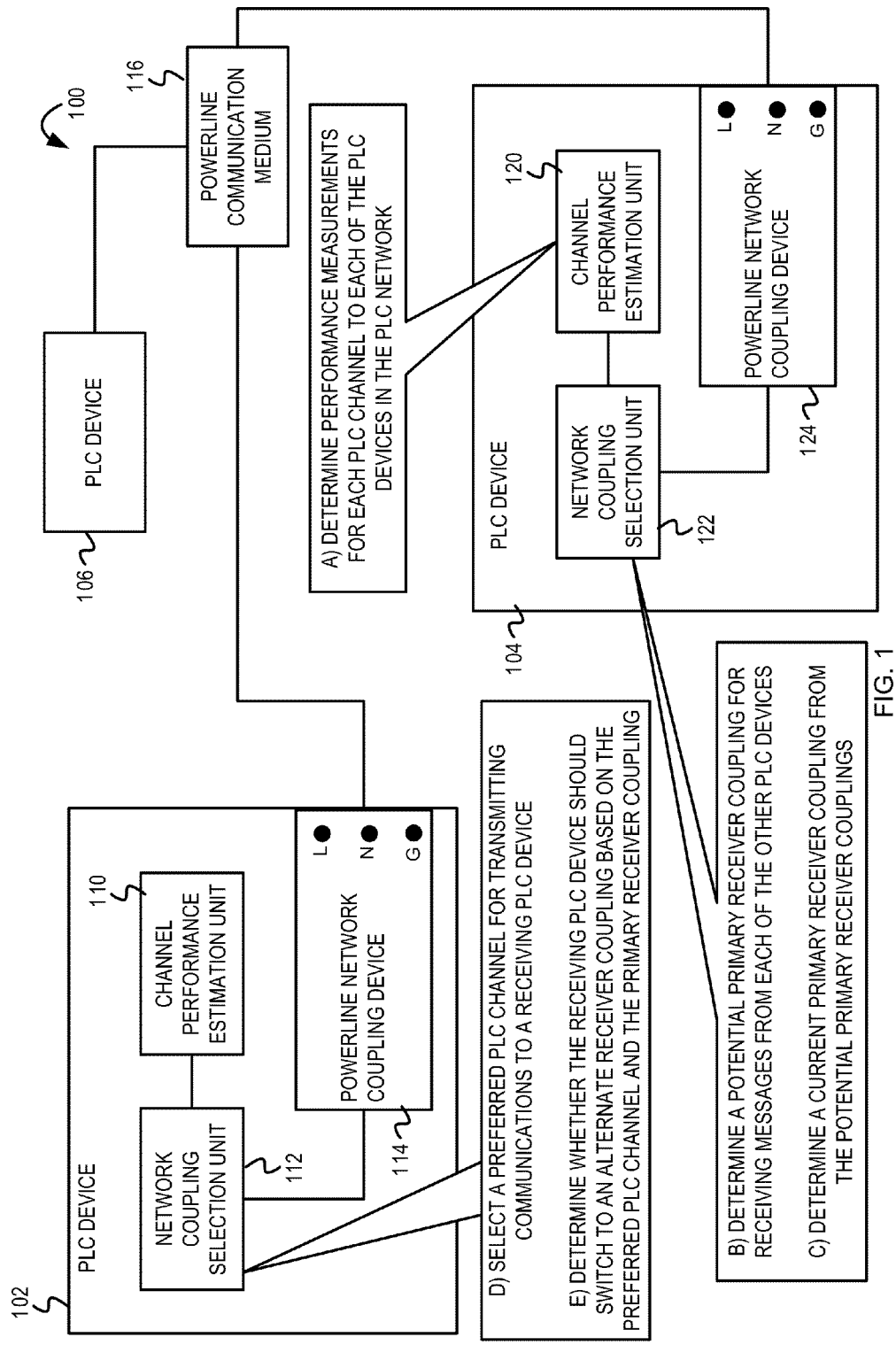
FIG. 1 is an example block diagram including a mechanism for dynamically selecting a primary receiver coupling in a powerline communication (PLC) network.

The description that follows includes exemplary systems, methods, techniques, instruction sequences, and computer program products that embody techniques of the present inventive subject matter. However, it is understood that the described embodiments may be practiced without these specific details. For instance, although examples refer to a mechanism for exploiting selection diversity in powerline communication systems that use power outlets with a specific configuration of three terminals, in other embodiments the mechanism for exploiting selection diversity can be implemented in the powerline communication systems that use power outlets with different terminal configurations or with a different number of terminals. In other instances, well-known instruction instances, protocols, structures, and techniques have not been shown in detail in order not to obfuscate the description.

Typically, several transformers are used to convert (e.g., by decreasing voltage and frequency) and distribute electric power from a power generation plant to buildings and other infrastructure. The secondary winding of the last distribution transformer is typically connected to the building panel board using three (or four) wires. One wire is for a neutral line and the others wires for the different voltage phases. From the panel board, the power is then distributed through the building using several branch circuits consisting typically of three wires namely Line (also known as Live or Phase), Neutral, and Ground (or protective Earth). In a powerline network, a three-prong polarized receptacle (e.g., comprising the line (L), neutral (N), and ground (G) terminals) is typically used to provide power to network devices in the powerline network. A powerline communication (PLC) device can use either a line-neutral (LN) network coupling or a line-ground (LG) network coupling to couple the PLC device to the powerline network and to enable the PLC device to transmit/receive PLC signals via the powerline network. Current implementations of the PLC specification (e.g., a HomePlug® AV 2.0 specification) support a selection diversity mechanism that enables the PLC device to use either the LN network coupling or the LG network coupling to transmit/receive communications. However, in the current implementations, the PLC device is configured to select the LN network coupling as the primary coupling (also referred to as default coupling). A transmitting PLC device and a receiving PLC device each use the primary LN network coupling (i.e., an LN-LN channel) to exchange information. However, if the LG network coupling (and the LG-LG channel) yields better performance and throughput, the transmitting PLC device transmits a "coupling switch" notification to indicate the use of alternate LG network coupling for the next transmitted message and to prompt the receiving PLC device to switch to the alternate LG network coupling to receive subsequent communications. The transmitting PLC device typically transmits the coupling switch notification (e.g., a clear-to-send (CTS) frame) before each message transmitted (to the receiving PLC device) on the alternate LG network coupling (and the LG-LG channel). This can increase the overhead and cause performance degradation in the PLC network. Furthermore, because the transmitting PLC device is typically unaware of the transmission duration of reverse direction transmissions from the receiving PLC device, bandwidth efficient bidirectional bursting techniques may not be employed when the alternate LG network coupling is used to transmit and/or receive messages. The inability to use bidirectional bursting techniques may further impair the performance of the PLC devices and the PLC network.

In some embodiments, instead of statically using a predetermined primary network coupling, a PLC device can be configured to adapt the primary receiver coupling selection (and selection of the preferred communication channel) to real-time channel performance. In other words, if the performance of a current alternate communication channel (e.g., an LG-LG channel) is preferred compared to the performance of a current primary communication channel (e.g., an LN-LN channel), the coupling selection can be dynamically adapted to designate the current alternate communication channel (e.g., the LG-LG channel) as the new primary communication channel and to designate the current primary communication channel (e.g., the LN-LN channel) as the new alternate communication channel. As will be further described below, the PLC device can implement a technique to select a primary receiver coupling for receiving unicast transmissions from each of the other PLC devices in the PLC network. The primary receiver coupling can be a default network coupling on which the PLC device listens for transmissions from the other PLC devices. Such a mechanism where the PLC device dynamically selects its primary receiver coupling based on real-time channel performance can help ensure that the PLC device is receiving messages on a preferred communication channel (e.g., a best performing communication channel). This can improve the overall performance of a PLC communication system under dynamic channel conditions. The mechanism for dynamically adapting the primary receiver coupling can also minimize the number of channel switch notifications that are transmitted in the PLC network, thus reducing overhead in the PLC network.

FIG. 1 is an example block diagram including a mechanism for dynamically selecting a primary receiver coupling in a powerline communication (PLC) network 100. In FIG. 1, the PLC network 100 comprises three PLC devices 102, 104, and 106. The PLC device 102 comprises a channel performance estimation unit 110, a network coupling selection unit 112, and a powerline network coupling device 114. The powerline network coupling device 114 can implement functionality to couple the PLC device 102 to a powerline medium 116 via two powerline terminals. In some embodiments, as depicted in FIG. 1, the line (L), neutral (N), and ground (G) terminals of the PLC device 102 can be part of the powerline network coupling device 114. In another embodiment, the line (L), neutral (N), and ground (G) terminals of the PLC device 102 can be part of a PLC interface. The powerline network coupling device 114 can interact with the PLC interface to couple the PLC device 102 to the powerline medium 116 via the appropriate powerline terminals. The PLC device 104 comprises a channel performance estimation unit 120, a network coupling selection unit 122, and a powerline network coupling device 124. As similarly described above, in some embodiments, as depicted in FIG. 1, the line (L), neutral (N), and ground (G) terminals of the PLC device 104 can be part of the powerline network coupling device 124. In another embodiment, the line (L), neutral (N), and ground (G) terminals of the PLC device 104 can be part of a PLC interface. The powerline network coupling device 124 can interact with the PLC interface to couple the PLC device 104 to the powerline medium 116 via the appropriate powerline terminals. Although not depicted in FIG. 1, the PLC device 106 can also comprise a channel performance estimation unit, a network coupling selection unit, and/or a powerline network coupling device. The PLC devices 102, 104, and 106 are coupled with a powerline medium 116. The powerline medium 116 can be a shared medium that enables multiple PLC devices to contend for control to transmit via the powerline medium. It is also noted that although FIG. 1 depicts a single line connecting the PLC devices 102, 104, and 106 to the powerline medium 116, it should be understood that the PLC devices 102, 104, and 106 are coupled with the powerline medium 116 via a three-wire line. In the description of FIG. 1, the PLC devices 102 and 106 transmit messages to the PLC device 104 and are therefore referred to as "transmitting PLC device." The PLC device 104 that receives the messages is referred to as the "receiving PLC device." It is noted however, that each of the PLC devices 102, 104, and 106 can be configured to execute the operations described below.

The powerline medium (formed using the line (L), neutral (N), and ground (G) wires) can offer potential PLC channels based on the line-neutral (LN) and line-ground (LG) network coupling options. A PLC channel can be represented as a combination of A) a coupling of two powerline outlet terminals at the transmitting PLC device 102 and B) a coupling of two powerline outlet terminals at the receiving PLC device 104. As will be further described below in stages A-C, the receiving PLC device 104 can dynamically select a primary receiver coupling based on performance on each communication channel between the receiving PLC device 104 and each of the transmitting PLC devices 102 and 106. As will be further described below in stages D-E, the transmitting PLC device 102 can select a preferred communication channel for communicating with the receiving PLC device 104.

At stage A, the receiving PLC device 104 (e.g., the channel performance estimation unit 120) determines performance measurements for each PLC channel to each of the PLC devices 102 and 106 in the PLC network 100. In some embodiments, the transmitting PLC devices 102 and 106 can each broadcast messages (on each network coupling) in the PLC network 100. These messages may be data messages, predetermined performance estimation messages, etc. The receiving PLC device 104 can receive (on each network coupling) messages from the PLC devices 102 and 106. As will be further described with reference to the example of FIG. 5, the transmitting PLC device 102 may transmit a first set of messages using its LN network coupling. The receiving PLC device 104 may receive some of the first set of messages using its LN network coupling and receive remaining of the first set of messages using its LG network coupling. The transmitting PLC device 102 may then switch to its LG network coupling and transmit a second set of messages using the LG network coupling. The receiving PLC device 104 may receive some of the second set of messages using its LN network coupling and receive remaining of the second set of messages using its LG network coupling.

In some embodiments, the network coupling selection unit 112 can direct the powerline network coupling device 114 to couple to the appropriate powerline outlet terminals of the transmitting PLC device 102 so that the messages are transmitted from the appropriate transmitter coupling. The powerline network coupling device 114 can employ various types of coupling mechanisms to couple the PLC device 102 to the powerline medium 116 via appropriate network couplings (e.g., indicated by the network coupling selection unit 112). For example, the powerline network coupling device 114 can comprise one or more switches that can couple the PLC device 102 to the line, neutral, and ground wires of the powerline medium 116. Depending on the selected network coupling, the network coupling selection unit 112 can enable or disable one or more of the switches. For example, the network coupling selection unit 112 may enable switches for the line wire and the ground wire and may disable a switch for the neutral wire, thus coupling the PLC device 102 to the powerline medium 116 via the LG network coupling. Furthermore, in some embodiments, the network coupling selection unit 112 can provide a notification to the powerline network coupling device 114 to identify terminal connections that represent the selected network coupling. The powerline network coupling device 114 can then enable/disable appropriate switches (or other suitable coupling devices) to couple the PLC device 102 to the powerline medium 116 via the selected network coupling. Likewise, the network coupling selection unit 122 can direct the powerline network coupling device 124 to couple to the appropriate powerline outlet terminals of the receiving PLC device 104 so that the messages are received on the appropriate receiver coupling. It is noted that the powerline network coupling device 124 as be implemented as similarly described above for the powerline network coupling device 114. Based on the messages received using all the network coupling combinations between the transmitting PLC device 102 and the receiving PLC device 104, the receiving PLC device 104 (e.g., the channel performance estimation unit 120) can estimate performance measurements for each transmitter-receiver (TX-RX) coupling combination ("channel") between the transmitting PLC device 102 and the receiving PLC device 104. The receiving PLC device 104 can execute similar operations to estimate performance measurements for each channel between the transmitting PLC device 106 and the receiving PLC device 104. It should be noted that the PLC devices 102 and 106 may also switch to a receive operating mode to receive messages transmitted by the PLC device 104.

At stage B, the receiving PLC device 104 (e.g., the network coupling selection unit 122) determines a potential primary receiver coupling for receiving messages from each of the transmitting PLC devices 102 and 106. The network coupling selection unit 122 can select the receiver coupling (of the receiving PLC device 104) that is associated with a preferred channel between the transmitting PLC device 102 and the receiving PLC device 104 as a potential primary receiver coupling. In one embodiment, the preferred channel between the transmitting PLC device 102 and the receiving PLC device 104 may be the best-performing channel between the transmitting PLC device 102 and the receiving PLC device 104. The best-performing channel may be determined based on the performance measurements determined at stage A. For example, the best-performing channel between the transmitting PLC device 102 and the receiving PLC device 104 can be the channel associated with the highest signal-to-noise ratio (SNR) and/or lowest error rate, etc. Likewise, the receiving PLC device 104 can identify a potential primary receiver coupling for communicating with each of the other transmitting PLC devices 106 in the PLC network 100. For each transmitting PLC device, the potential primary receiver coupling can be a preferred receiver coupling (of the receiving PLC device 104) for receiving unicast messages from the transmitting PLC device. Each of the potential primary receiver couplings can be determined independent of each other.

At stage C, the receiving PLC device 104 (e.g., the network coupling selection unit 122) determines a current primary receiver coupling from the potential primary receiver couplings. After determining the potential primary receiver coupling for receiving unicast messages from each of the transmitting PLC devices 102 and 106, the receiving PLC device 104 can compare the potential primary receiver couplings. If all the identified potential primary receiver couplings are the same, this network coupling can be designated as the primary receiver coupling of the receiving PLC device 104. In some cases, the receiving PLC device 104 may identify one network coupling (e.g., the LN network coupling) as the potential primary receiver coupling for a subset of transmitting PLC devices and may identify a different network coupling (e.g., the LG network coupling) as the potential primary receiver coupling for the remaining transmitting PLC devices. However, the receiving PLC device 104 may only be associated with a single primary receiver coupling (e.g., because the receiving PLC device is typically unaware of when and which PLC device will transmit a message). As will be further described with reference to FIGS. 3 and 4, the receiving PLC device 104 (e.g., the network coupling selection unit 122) can select the primary receiver coupling from the potential receiver couplings based, at least in part, on performance measurements (determined at stage A), traffic received from each of the transmitting PLC devices, data rate, and other suitable considerations. The receiving PLC device 104 can then transmit a notification of the selected primary receiver coupling to the other PLC devices 102 and 106 in the PLC network 100.

At stage D, the transmitting PLC device 102 selects a preferred PLC channel for transmitting communications to the receiving PLC device 104. If the transmitting PLC device 102 determines to transmit a unicast message to the receiving PLC device 104, the transmitting PLC device 102 (e.g., the network coupling selection unit 112) can determine the preferred TX-RX coupling (e.g., the preferred channel) for transmitting unicast messages to the receiving PLC device 104. For example, as will be further described in FIG. 7, the transmitting PLC device 102 can determine the performance of (and/or a weight for) each communication channel between the transmitting PLC device 102 and the receiving PLC device 104. For example, the transmitting PLC device 102 (e.g., the channel performance estimation unit 110) can determine the performance of the LN-LG, LG-LG, LN-LN, and LG-LN channels. The channel with the preferred performance can be selected for communicating with the receiving PLC device 104. It is noted that the preferred PLC channel can be selected after taking into account potential overheads associated with causing the receiving PLC device 104 to switch from the primary receiver coupling.

At stage E, the transmitting PLC device 102 (e.g., the network coupling selection unit 112) determines whether the receiving PLC device 104 should switch to an alternate receiver coupling based on the preferred PLC channel and the primary receiver coupling. After the transmitting PLC device 102 selects the preferred PLC channel for communicating with the receiving PLC device 104, the transmitting PLC device 102 can determine the receiver coupling associated with the selected preferred PLC channel. For example, the transmitting PLC device 102 may select the LN-LN channel as the preferred PLC channel for transmitting unicast messages to the receiving PLC device 104. In this example, the receiver coupling associated with the preferred PLC channel is the LN network coupling. The transmitting PLC device 102 can compare the receiver coupling associated with the preferred PLC channel against the primary receiver coupling (indicated by the receiving PLC device 104 at stage C). If the receiver coupling associated with the preferred PLC channel matches the primary receiver coupling, the transmitting PLC device 102 can transmit the unicast messages to the receiving PLC device 104. However, if the receiver coupling associated with the preferred PLC channel is different from the primary receiver coupling, the transmitting PLC device 102 can first transmit a coupling switch notification to cause the receiving PLC device 104 to switch to an alternate network coupling. For example, if the receiver coupling associated with the preferred PLC channel is the LN network coupling and if the primary receiver coupling is the LG network coupling, the transmitting PLC device 102 can transmit a CTS message (or another suitable coupling switch notification) to cause the receiving PLC device 104 to switch from the LN network coupling to the LG network coupling. After the receiving PLC device 104 switches to the appropriate receiver coupling, the transmitting PLC device 102 can transmit the unicast messages to the receiving PLC device 104.

It is noted that although FIG. 1 describes operations of the PLC devices in stages A-E, the operations need not be executed sequentially. In some embodiments, some of the operations described in FIG. 1 may not be executed. For example, the operations of stages D and E may be consistently executed, while the operations of stages B and C may be executed at periodic/intermittent intervals. Furthermore, it is noted that the transmitting PLC device 102 can also execute the operations described in stages A-C; while the receiving PLC device 104 can also execute the operations described in stages D-E.

Figure 2:
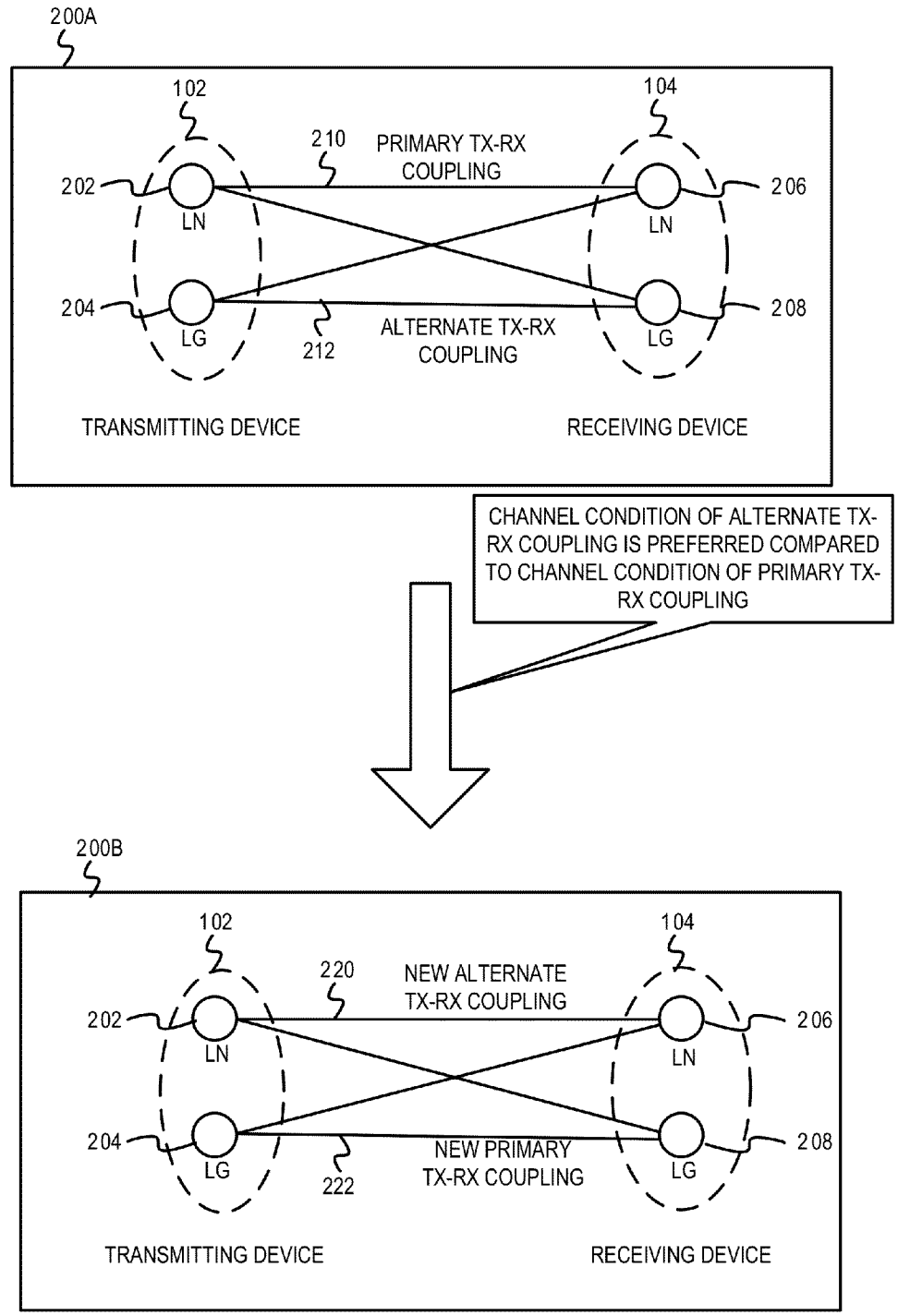
FIG. 2 is an example conceptual diagram including a mechanism for adaptive transmitter-receiver coupling selection.

FIG. 2 is an example conceptual diagram including a mechanism for adaptive transmitter-receiver coupling selection. FIG. 2 depicts the transmitting PLC device 102 including an LN network coupling 202 and an LG network coupling 204. FIG. 2 also depicts the receiving PLC device 104 including an LN network coupling 206 and an LG network coupling 208. Initially, as depicted in scenario 200A, the transmitting PLC device 102 and the receiving PLC device 104 may each be configured to designate their respective LN network couplings 202 and 206 as the primary network coupling. In other words, initially, the transmitting PLC device 102 may transmit frames intended for the receiving PLC device 104 from the LN network coupling 202 (of the transmitting PLC device 102) to the LN network coupling 206 (of the receiving PLC device 104). Initially, the LN-LN channel between the transmitting PLC device 102 and the receiving PLC device 104 is the primary (or default) TX-RX network coupling 210. The LG-LG channel between the transmitting PLC device 102 and the receiving PLC device 104 is the secondary (or alternate) TX-RX network coupling 212. However, after executing operations described in stages A-C of FIG. 1, the transmitting PLC device 102 may determine that the channel condition (e.g., throughput or other suitable performance measurement) of the secondary TX-RX network coupling 212 is preferred compared to the channel condition of the primary TX-RX network coupling 210. For example, the transmitting PLC device 102 may determine that the throughput of the alternate LG-LG channel 212 surpasses the throughput of the primary LN-LN channel 210. As discussed above, instead of statically using the primary LN-LN channel 210 and/or using the alternate LG-LG channel 212 at the expense of a higher overhead, when the channel condition of the current alternate channel 212 is better than that of the current primary channel 210, the receiving PLC device 104 (e.g., the network coupling selection unit 122) can change the receiver coupling selection so that the old alternate TX-RX network coupling 212 (e.g., the LG-LG channel) is the new primary TX-RX network coupling 222 and the old primary TX-RX network coupling 210 (e.g., the LN-LN channel) is the new alternate TX-RX network coupling 220. This is illustrated in scenario 200B, where after execution operations discussed in stages A-C of FIG. 1, the LG network coupling 208 is the primary receiver coupling, the LG-LG channel is the primary channel 222 and the LN-LN channel is the alternate channel 220.

Figure 3:
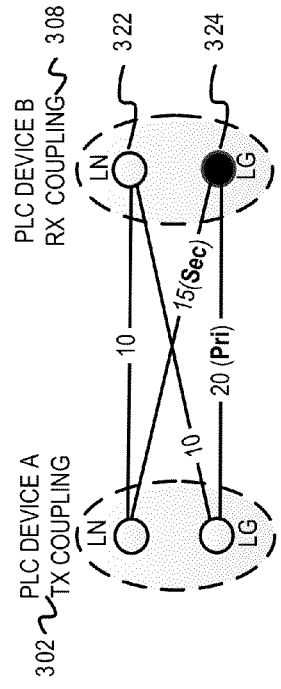
FIG. 3 is a conceptual diagram illustrating one example for coordinating primary and secondary transmitter-receiver couplings across multiple PLC devices to select a primary receiver coupling.
Figure 3:
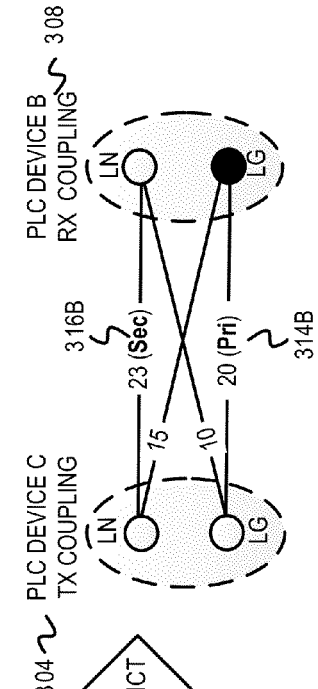
Figure 3:
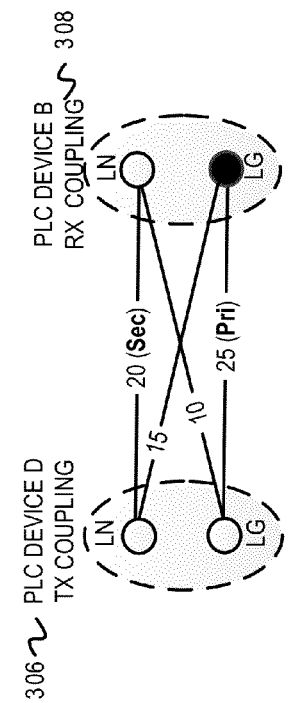
Figure 3:
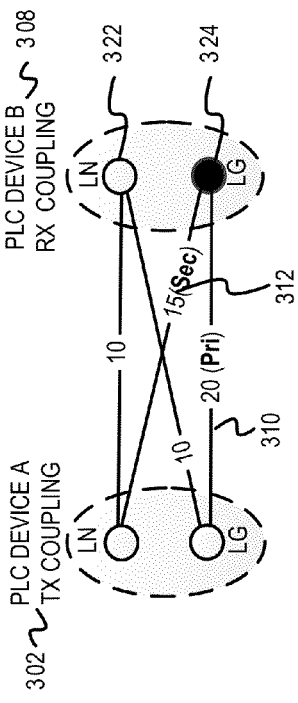
Figure 3:
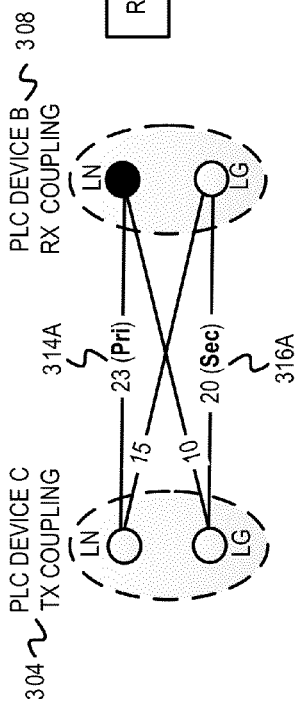
Figure 3:
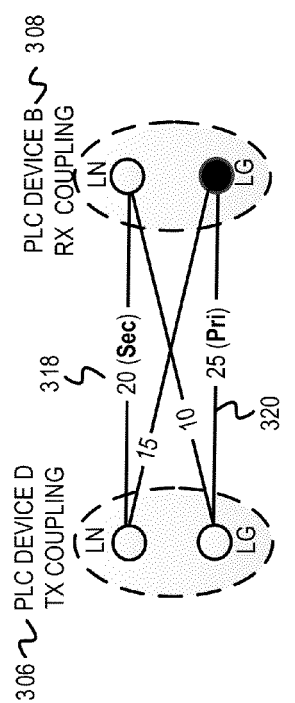

FIG. 3 depicts a conceptual diagram including primary and secondary TX-RX coupling selections for three pairs of PLC devices—1) transmitting PLC device A 302 and receiving PLC device B 308, 2) transmitting PLC device C 304 and receiving PLC device B 308, and 3) transmitting PLC device D 306 and receiving PLC device B 308. The left side of FIG. 3 depicts the receiving PLC device 308 selecting a potential primary and secondary TX-RX coupling (or primary channel) for receiving unicast messages from each of the transmitting PLC devices 302, 304, and 306. In the example of FIG. 3, for each of the transmitting PLC devices 302, 304, and 306, the receiving PLC device 308 (e.g., the network coupling selection unit 122) assigns a weight to each communication channel between the transmitting PLC device and the receiving PLC device 308. The receiving PLC device 308 can assign the weight to each communication channel based on one or more transmission conditions and characteristics, such as PHY data rate, expected link throughput, link quality, traffic intensity, quality-of-service (QoS) requirements, bit error rate (BER), packet error rate (PER), signal strength, signal-to-noise ratio (SNR), and/or other suitable factors. In some embodiments, the receiving PLC device 308 can assign the weight based on one transmission condition (e.g., amount of traffic received from each transmitting PLC device). In other embodiments, however, the receiving PLC device 308 can assign the weight based on a combination (e.g., a weighted combination) of multiple transmission conditions (e.g., amount of traffic received from the transmitting PLC device, error rate of received transmissions, signal strength of received transmissions, etc.).

In the example of FIG. 3, for each transmitting PLC device 302, 304, and 306, the receiving PLC device 308 (e.g., the network coupling selection unit 122) selects the TX-RX coupling associated with the highest weight as the potential primary TX-RX coupling. For each transmitting PLC devices 302, 304, and 306, the receiving PLC device 308 selects the TX-RX coupling associated with the second highest weight as the potential secondary TX-RX coupling. In the example of FIG. 3, the receiving PLC device 308 (e.g., the network coupling selection unit 122) selects the LG-LG TX-RX coupling 310 as the primary channel and the LN-LG TX-RX coupling 312 as the secondary channel for receiving transmissions from the transmitting PLC device 302. The receiving PLC device 308 selects the LN-LN TX-RX coupling 314A as the primary channel and the LG-LG TX-RX coupling 316A as the secondary channel for receiving transmissions from the transmitting PLC device 304. The receiving PLC device 308 selects the LG-LG TX-RX coupling 320 as the primary channel and the LN-LN TX-RX coupling 318 as the secondary channel for receiving transmissions from the transmitting PLC device 306.

The receiver network coupling (of the receiving PLC device 308) associated with each of the potential primary TX-RX couplings is referred to as the "potential primary receiver coupling." Accordingly, with reference to the example of FIG. 3, an LG network coupling 324 of the receiving PLC device 308 is selected as the potential primary receiver coupling for communicating with two of the transmitting PLC devices 302 and 306; while the LN network coupling 322 of the receiving PLC device 308 is selected as the potential primary receiver coupling for communicating with the remaining transmitting PLC device 304. It is noted, however, that the receiving PLC device 308 can use other suitable techniques and performance metrics to select the potential primary TX-RX coupling, the potential secondary TX-RX coupling, and the potential primary receiver coupling.

However, the receiving PLC device 308 is typically unaware of when the transmitting PLC devices 302, 304, and 306 will transmit messages to the receiving PLC device 308. Therefore, the receiving PLC device 308 may only have one primary receiver coupling on which the receiving PLC device 308 listens (by default) for transmissions from the other PLC devices 302, 304, and 306. The receiving PLC device 308 can coordinate between the conflicting potential primary and secondary TX-RX couplings to resolve the conflict among the different potential primary receiver couplings selected for each of the PLC devices 302, 304, and 306 and to select a single primary receiver coupling (for the receiving PLC device 308), thus maximizing overall system performance. For example, the receiving PLC device 104 can identify a primary TX-RX coupling for receiving unicast traffic from each of the transmitting PLC devices 302, 304, and 306 so that each of the selected primary TX-RX couplings have a common primary receiver coupling. In some embodiments, the new primary and secondary TX-RX couplings (with a non-conflicting primary receiver coupling) for receiving unicast traffic from each transmitting PLC device can be selected to maximize the aggregated weight of the primary and secondary TX-RX couplings for each of its associated unicast traffic.

The right side of FIG. 3 depicts the coordinated potential primary and secondary TX-RX couplings between the receiving PLC device 308 and each of the transmitting PLC devices 302, 304, and 306. The receiving PLC device 308 can employ various techniques to coordinate the potential primary receiver couplings and select a single primary receiver coupling. For example, the receiving PLC device 308 may determine (e.g., based on knowledge of transmissions schedules of the PLC devices 302, 304, and 306, based on historical analysis, etc.) that 90% of the total received traffic is from the PLC device 302, that 8% of the total received traffic is from the PLC device 304, and that 2% of the total received traffic is from the PLC device 306. In this example, the receiving PLC device 308 can translate the percentage of total received traffic into corresponding weights associated with each of the transmitting PLC devices and receiver network couplings. The receiving PLC device 308 can translate the 90%, 8%, and 2% of the total received traffic received from the PLC devices 302, 304, and 308 respectively, into a weight of 0.9, 0.08, and 0.02 for the PLC devices 302, 304, and 308 respectively. Accordingly, with reference to the example on the left side of FIG. 3, the PLC devices 302 and 306 are associated with the potential LG receiver network coupling, while the PLC device 304 is associated with the potential LN receiver network coupling. Therefore, in this example, the potential LG receiver network coupling may be assigned a total weight of 0.9+0.02=0.92, while the potential LN receiver network coupling may be assigned a total weight of 0.08. Based on these example weights, the receiving PLC device 308 can select the LG network coupling 324 as the primary receiver coupling of the receiving PLC device 308. As another example, the receiving PLC device 308 may select the potential primary receiver coupling associated with the preferred performance (e.g., highest throughput, lowest error rate, etc.) as the current primary receiver coupling.

The receiving PLC device 308 (e.g., the network coupling selection unit 122) can swap the potential secondary TX-RX coupling and the potential primary TX-RX coupling for the transmitting PLC device 304. In other words, as discussed above, the receiving PLC device 308 initially selects the LN-LN channel 314A as the potential primary TX-RX coupling and the LG-LG channel 316A as the potential secondary TX-RX coupling between the transmitting PLC device 304 and the receiving PLC device 308. After conflict resolution, the receiving PLC device 308 can designate the LN-LN channel as the new potential secondary TX-RX coupling 316B and the LG-LG channel as the new potential primary TX-RX coupling 314B between the transmitting PLC device 304 and the receiving PLC device 308. After conflict resolution, the LG network coupling 324 of the receiving PLC device 308 is the potential primary receiver coupling for communicating with all of the transmitting PLC devices 302, 304, and 306. Accordingly, the LG network coupling 324 is the designated as the primary receiver coupling (or default receiver coupling or preferred receiver coupling) of the receiving PLC device 308.

It is noted that after the receiving PLC device 308 (e.g., the network coupling selection unit 122) performs conflict resolution and selects the primary receiver coupling, the receiving PLC device 308 can notify the other PLC devices 302, 304, and 306 about the primary receiver coupling associated with the PLC device 308. As will be further discussed below in FIG. 7, if determined to transmit a message to the receiving PLC device 308, the transmitting PLC device 302 can select a preferred channel for communicating with the receiving PLC device 308. If the preferred channel (as determined by the transmitting PLC device 302) requires the receiving PLC device 308 to use an alternate receiver coupling (e.g., a network coupling that is different from the primary receiver coupling 324), the transmitting PLC device 302 can transmit a coupling switch notification to the receiving PLC device 308 to prompt the receiving PLC device 308 to switch to the alternate receiver coupling.

Figure 4:
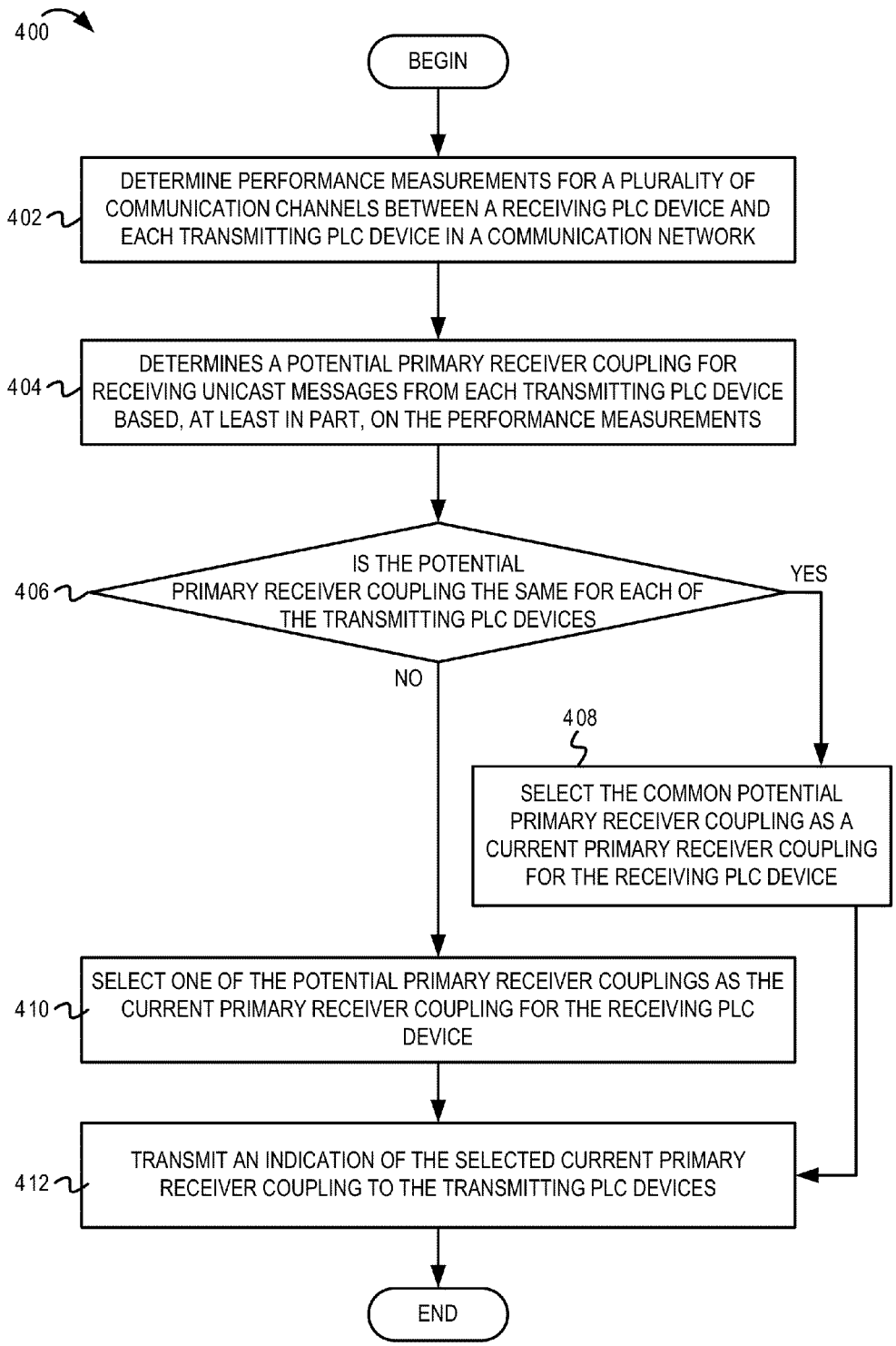
FIG. 4 is a flow diagram illustrating example operations for adaptive selection of a primary receiver coupling.

FIG. 4 is a flow diagram ("flow") 400 illustrating example operations for adaptive selection of a primary receiver coupling. The flow 400 begins at block 402.

Figure 5:
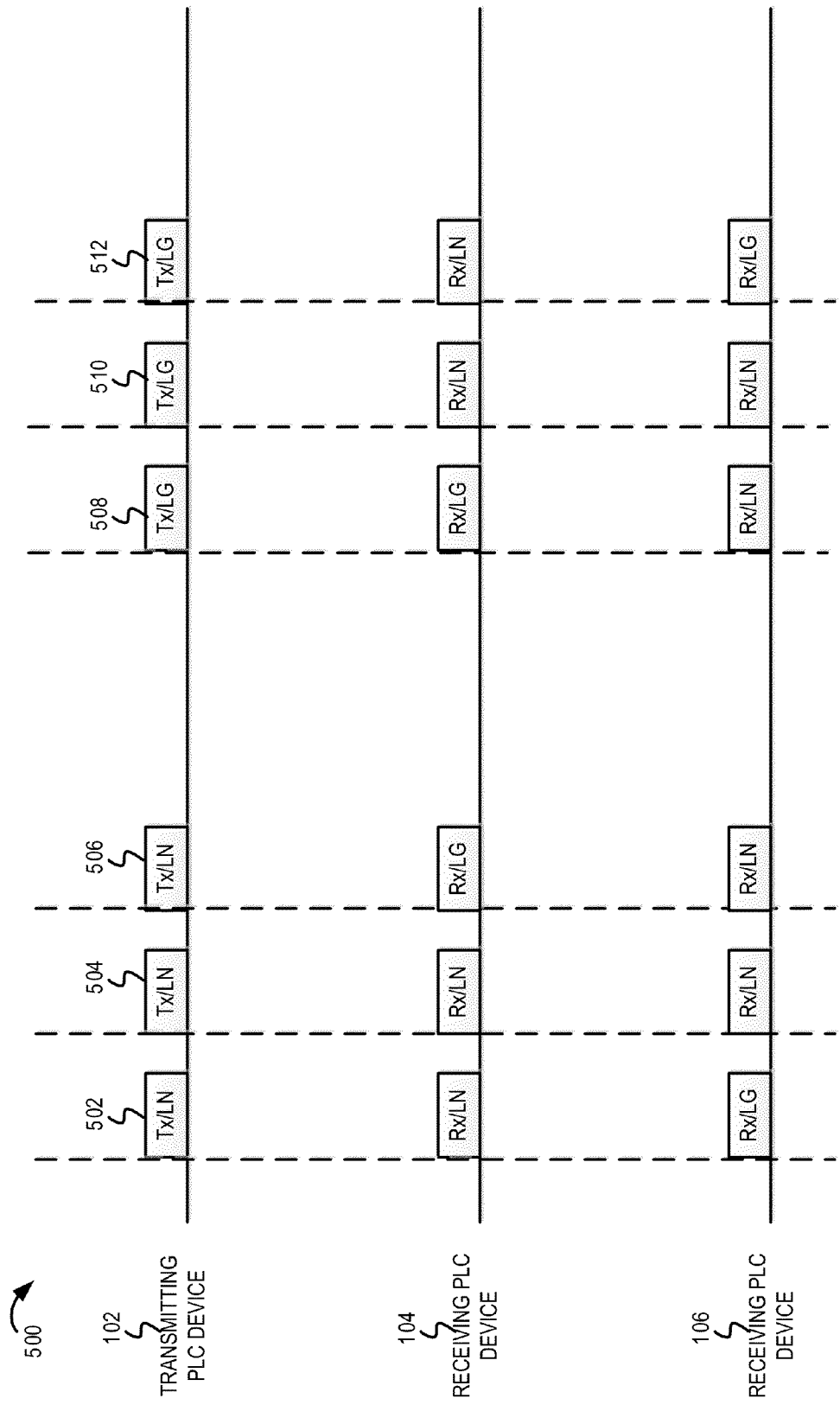
FIG. 5 is a timing diagram illustrating one example for channel condition measurement with dynamic transmitter-receiver coupling selections.

At block 402, a receiving PLC device determines performance measurements for a plurality of communication channels between the receiving PLC device and each transmitting PLC device in a communication network. As discussed above with reference to FIG. 1, each communication channel between the transmitting PLC device 102 and the receiving PLC device 104 can be a combination of a network coupling of the transmitting PLC device 102 and a network coupling of the receiving PLC device 104. Referring to FIG. 2, in one embodiment, there can be four communication channels between the PLC devices 102 and 104, 1) a channel formed by the combination of the LN network coupling 202 and the LN network coupling 206, 2) a channel formed by the combination of the LN network coupling 202 and the LG network coupling 208, 3) a channel formed by the combination of the LG network coupling 204 and the LN network coupling 206, and 4) a channel formed by the combination of the LG network coupling 204 and the LG network coupling 208. FIG. 5 will further describe how each PLC device estimates performance measurements for a plurality of communication channels between itself and every other PLC devices.

FIG. 5 depicts timing diagram 500 for communications exchanged between PLC devices 102 104, and 106. In the example of FIG. 5, the PLC device 102 is a transmitting PLC device, while the PLC devices 104 and 106 are receiving PLC devices. For example, the network coupling selection unit 112 can direct the powerline network coupling device 114 to couple to the appropriate powerline outlet terminals (e.g., the line terminal and the neutral terminal) of the transmitting PLC device 102. In this example, the transmitting PLC device 102 can transmit messages 502, 504, and 506 from its LN network coupling (depicted in FIG. 5 as Tx/LN). The receiving PLC devices 104 and 106 select their respective network coupling to receive messages transmitted by the PLC device 102 and to determine performance measurements based on the received measurements. In the example of FIG. 5, the receiving PLC device 104 switches to the LN network coupling to receive the messages 502 and 504 (depicted in FIG. 5 as Rx/LN) and switches to the LG network coupling to receive the message 506 (depicted in FIG. 5 as Rx/LG). For example, the network coupling selection unit 122 can direct the powerline network coupling device 124 to couple to the appropriate powerline outlet terminals of the receiving PLC devices 104 and 106. The receiving PLC device 106 switches to the LG network coupling to receive the message 502 and switches to the LN network coupling to receive the messages 504 and 506. Furthermore, after transmitting the messages 502, 504, and 506, the transmitting PLC device 102 switches to its LG network coupling and transmits messages (from the LG network coupling) 508, 510, and 512 (depicted in FIG. 5 as Tx/LG). In the example of FIG. 5, the receiving PLC device 104 receives the message 508 on its LG network coupling and then switches to the LN network coupling to receive the messages 510 and 512. The receiving PLC device 106 receives the messages 508 and 510 on the LN network coupling and then switches to the LG network coupling to receive the message 512. Although not depicted in FIG. 5, it is noted that after transmitting messages via the LN and the LG network couplings, the PLC device 102 can switch to a receive mode and can receive messages (on its LN and LG network couplings) transmitted by other PLC devices 104 and 106. It is noted that the receiving PLC devices 104 and 106 (e.g., the channel performance estimation unit 120) can each determine the performance measurements after receiving a desired number of messages on each combination of TX-RX network couplings.

Additionally, although not depicted in FIG. 5, the PLC devices 104 and 106 can each switch to a transmit mode and can transmit one or more messages to other PLC devices in the PLC network. The PLC devices can employ various techniques to change their network coupling selection (LG network coupling or LN network coupling) and to select their operating mode (e.g., transmit operating mode or receive operating mode). In some embodiments, the transmitting PLC device and receiving PLC devices can switch their respective network couplings in accordance with a predetermined schedule. In another embodiment, each PLC device may randomly select its transmitter or receiver coupling based on traffic distributions or performance measurements. In some embodiments, each PLC device may switch its transmitter or receiver coupling selection based, at least in part, on the confidence of channel condition information and/or the channel condition correlation between different network couplings. In some embodiments, the confidence of the channel condition information may be evaluated based, at least in part, on the number of channel measurement messages received and used to estimate the performance measurements of the channel. In some embodiments, the channel condition correlation can be determined by processing historical channel condition information of different network couplings. For example, a PLC device may determine that its receiver LN network coupling has a better performance than its receiver LG network coupling. In this example, the PLC device may only probe the channel condition of its receiver LG network coupling (e.g., receive messages via the LG network coupling). As another example, the PLC device may probe the channel condition of those network couplings that are associated with the channel condition that is greater than a threshold. Furthermore, it is noted that FIG. 5 depicts one example schedule for switching between different network couplings and for switching between a transmit and receive operating mode. In other embodiments, each PLC device can transmit any suitable number of messages and for any suitable duration of time, can switch between network couplings at any suitable time instant and in accordance with a predetermined or dynamically determined schedule, and can switch between a transmit and receive operating mode at any suitable time instant and in accordance with a predetermined or dynamically determined schedule. Referring back to FIG. 4, after the performance measurements for the plurality of communication channels between the receiving PLC device and each transmitting PLC device are determined, the flow continues at block 404.

At block 404, the receiving PLC device determines a potential primary receiver coupling for receiving unicast messages from each transmitting PLC device based, at least in part, on the performance measurements. For example, for each of the transmitting PLC devices, the receiving PLC device 104 (e.g., the network coupling selection unit 122) can analyze the performance measurements associated with the communication channels between itself and the transmitting PLC device (e.g., the PLC device 102). The receiving PLC device 104 (e.g., the network coupling selection unit 122) can use the performance measurements to select a preferred receiver coupling for receiving unicast messages from each transmitting PLC device. Referring to the example of FIG. 3, the receiving PLC device 308 may determine that the LN network coupling 322 yields the preferred performance for receiving unicast messages from the transmitting PLC device 304, and that LG network coupling 324 yields the preferred performance for receiving unicast messages from the transmitting PLC devices 302 and 306. In other words, the receiving PLC device 308 may select the LG network coupling 324 as the potential primary receiver coupling for receiving unicast messages from the transmitting PLC devices 302 and 306. The receiving PLC device 308 may select the LN network coupling 322 as the potential primary receiver coupling for receiving unicast messages from the transmitting PLC device 304. As will be further discussed below, the receiving PLC device 308 can execute contention resolution operations on the potential primary receiver couplings (if needed) to select a single primary (or default) receiver coupling across all the transmitting PLC devices. The flow continues at block 406.

At block 406, it is determined whether the potential primary receiver coupling is the same for each of the transmitting PLC devices. For example, if (at block 404), the receiving PLC device 308 selects the LG network coupling 324 as the preferred network coupling for receiving unicast messages from each of the transmitting PLC devices 302, 304, and 306, it can be determined that the potential primary receiver coupling is the same across all the transmitting PLC devices. However, as depicted on the left side of FIG. 3, the receiving PLC device 308 (e.g., the network coupling selection unit 122) may select the one network coupling (e.g., the LN network coupling 322) as the potential primary receiver coupling for receiving unicast messages from a subset of the transmitting PLC devices and may select a different network coupling (e.g., the LG network coupling 324) as the potential primary receiver coupling for receiving unicast messages from the remaining PLC devices. In this case, it may be determined that the potential primary receiver coupling is not the same across each of the transmitting PLC devices. If it is determined that the potential primary receiver coupling is the same for each of the plurality of transmitting network devices, the flow continues at block 408. Otherwise, the flow continues at block 410.

At block 408, the common potential primary receiver coupling is selected as the primary receiver coupling for the first network device. For example, if the receiving PLC device 308 determines (at block 406) that the LG network coupling 324 is the potential primary receiver coupling (or the preferred receiver coupling) for receiving unicast messages from each of the transmitting PLC devices 302, 304, and 306 in the PLC network, the network coupling selection unit 122 can select the LG network coupling 324 as the primary receiver coupling (or default receiver coupling) for the receiving PLC device 308. The flow continues at block 412.

At block 410, the primary receiver coupling for the receiving PLC device is selected from the potential primary receiver couplings determined for the plurality of transmitting PLC devices to maximize performance of the receiving PLC device. With reference to the example of FIG. 3, the receiving PLC device 308 (e.g., the network coupling selection unit 122) may select the LG network coupling 324 as the potential primary receiver coupling (e.g., a preferred network coupling) for receiving unicast messages from the transmitting PLC devices 302 and 306 and may select the LN network coupling 322 as the potential primary receiver coupling for receiving unicast messages from the transmitting PLC device 304. The receiving PLC device 308 can coordinate between multiple conflicting potential primary receiver couplings to select a single current primary receiver coupling (also referred to as "default receiver coupling") for the receiving PLC device 308. The primary receiver coupling can be selected from the potential primary receiver couplings based on one or more factors such as, traffic rate and schedule, PHY layer data rate, communication channel performance, etc. As described above in FIG. 3, to select the primary receiver coupling, the receiving PLC device 308 (e.g., the network coupling selection unit 122) can assign a weight to each of the network couplings 322 and 324 based on performance of the corresponding channels, the traffic load, etc. and may select the current primary receiver coupling based, at least in part, on the assigned weights. In the example of FIG. 3, the receiving PLC device 308 may receive a small percentage of traffic (e.g., 5% of the total received traffic) from the transmitting PLC device 304 and may receive a large percentage of traffic (e.g., 90% of the total received traffic) from the transmitting PLC device 302. Accordingly, the receiving PLC device 104 may select the potential primary receiver coupling (e.g., the LG network coupling 324) associated with the transmitting PLC device 302 as the current primary receiver coupling. It is noted that in other embodiments, the receiving PLC device 308 can use other suitable techniques and performance metrics (e.g., throughput) to select the primary receiver coupling. It should be noted that after executing the operation of block 404, the operations described in blocks 406, 408, and 410 may be generalized as determining the current primary receiver coupling of the PLC device 308 based on the potential primary receiver couplings determined for all of the transmitting PLC devices. From block 410, the flow continues at block 412.

At block 412, an indication of the selected current primary receiver coupling is transmitted to the other PLC devices in the PLC network. For example, the PLC device 308 (e.g., the network coupling selection unit 122) can select its primary receiver coupling (at block 410 or block 408) and can transmit a notification of the selected primary receiver coupling to the other PLC devices 302, 304, and 306 in the PLC network. Any messages transmitted from the PLC devices 302, 304, and 306 to the receiving PLC device 104 will be received (by default) on the current primary receiver coupling of the receiving PLC device 308. As will be further discussed below in FIG. 7, the receiving PLC device 308 can switch to an alternate receiver coupling in response to a notification from a transmitting PLC device (e.g., indicating a preferred receiver network coupling determined at the transmitting PLC device that is different than the current primary receiver coupling). From block 412, the flow ends.

Figure 6:
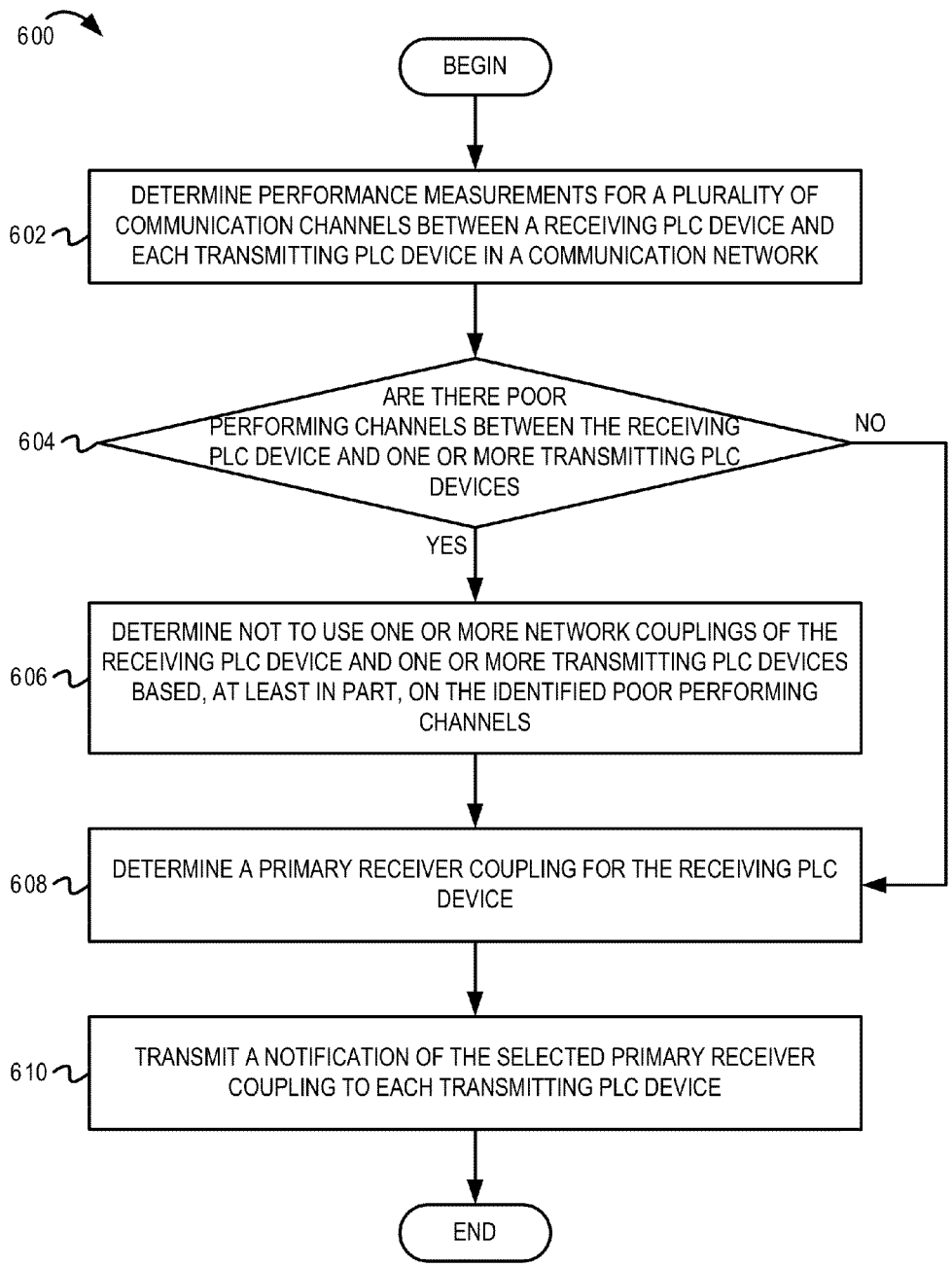
FIG. 6 is a flow diagram illustrating another embodiment for adaptive selection of a primary receiver coupling.

FIG. 6 is a flow diagram 600 illustrating another embodiment for adaptive selection of a primary receiver coupling. The flow 600 begins at block 602.

At block 602, a receiving PLC device determines performance measurements for a plurality of communication channels between the receiving PLC device and each transmitting PLC device in a communication network. As discussed above with reference to FIG. 4 (block 402) and FIG. 5, the receiving PLC device 104 can receive one or more messages on one or more communication channels between the receiving PLC device and each transmitting PLC device. The receiving PLC device 104 (e.g., the channel performance estimation unit 120) can determine performance measurements for the plurality of communication channels based on the received messages. In some embodiments, the receiving PLC device 104 can probe (e.g., periodically or based on a schedule) the channel condition of all the transmitter-receiver couplings (e.g., all the communication channels) between the transmitting PLC device 102 and the receiving PLC device 104. In some embodiments, the channel condition can be estimated by overhearing transmissions from another PLC device. In another embodiment, the channel condition can be estimated by explicitly transmitting control messages (e.g., sounding messages) to other PLC devices and receiving responses from the other PLC devices. As discussed above with reference to FIG. 5, when a transmitting PLC device (e.g., the transmitting PLC device 102) transmits data/messages from a current transmitter coupling (e.g. an LN network coupling), the receiving PLC device 104 (e.g., the channel performance estimation unit 120) can start to measure the channel condition at its current receiver coupling by processing a detected message delimiter (e.g., start of frame (SOF) delimiter) sent from the transmitting PLC device 102. After estimating the channel condition of the communication channel (e.g., formed by a combination of the current transmitter coupling and the current receiver coupling) with a high confidence, the receiving PLC device 104 can switch its receiver coupling to receive the subsequent data/messages (transmitted by the transmitting PLC device 102) to measure the channel condition of a new communication channel. The transmitting PLC device 102 may also switch to a different transmitter coupling to transmit data messages. The flow continues at block 604.

At block 604, it is determined whether there are poor performing channels between the receiving PLC device and one or more transmitting PLC devices. For the transmitting PLC device 102, the receiving PLC device 104 (e.g., the network coupling selection unit 122) can identify poor performing channels between the receiving PLC device 104 and the transmitting PLC device 102 based, at least in part, on the performance measurements determined at block 602. The poor performing channels can be those communication channels that are associated with performance measurements that are not in accordance with corresponding performance measurement thresholds. For example, if the SNR of a communication channel (between the transmitting PLC device 102 and the receiving PLC device 104) is less than a threshold SNR, the receiving PLC device 104 can designate this communication channel as a poor performing channel. Some examples of performance measurements can include the signal-to-noise ratio, bit error rate, frame error rate, PHY data rate, and other suitable performance measurements. The receiving PLC device 104 can keep a record of the poor performing channels to avoid using the poor performing channels. For example, the receiving PLC device 104 (e.g., the network coupling selection unit 122) can maintain a poor channel database (or another suitable data structure) to keep track of the identified poor performing channels between the receiving PLC device 104 and each of the transmitting PLC devices. If there are poor performing channels between the receiving PLC device and one or more transmitting PLC devices, the flow continues at block 606. Otherwise, if there are no poor performing channels, the flow continues at block 608.

At block 606, it is determined not to use one or more network couplings of the receiving PLC device and one or more transmitting PLC devices based, at least in part, on the identified poor performing channels. The flow 600 moves from block 604 to block 606 if there are poor performing channels between the receiving PLC device 104 and the transmitting PLC devices 102 and 106. In one embodiment, the receiving PLC device 104 (e.g., the network coupling selection unit 122) can analyze each poor performing channel in the poor channels database and can identify a transmitter coupling of the transmitting PLC device 102 and a receiver coupling of the receiving PLC device 104 that form the poor performing channel. In some embodiments, the receiving PLC device 104 (e.g., the network coupling selection unit 122) can determine not to use any communication channels formed by the identified transmitter coupling of the transmitting PLC device 102 and/or the identified receiver coupling of the receiving PLC device 104. For example, the receiving PLC device 104 may determine that the SNR of the LG-LN TX-RX coupling (i.e., communication channel) between the transmitting PLC device 102 and the receiving PLC device 104 is less than an SNR threshold. Accordingly, the LG-LN communication channel can be identified as a poor performing channel. It may then be determined that the LG network coupling of the transmitting PLC device 102 and the LN network coupling of the receiving PLC device 104 form the poor performing LG-LN channel. Accordingly, the receiving PLC device 104 can record (e.g., in a poor couplings database or another suitable data structure) the LG network coupling of the transmitting PLC device 102 and the LN network coupling of the receiving PLC device 104 as "unusable" network couplings (or poor performing network couplings). In other words, the receiving PLC device 104 (e.g., the network coupling selection unit 122) may determine not to receive any messages on its LN network coupling and not to receive any messages transmitted from the LG network coupling of the transmitting PLC device 102. In some embodiments, the receiving PLC device 104 may also review the poor channel database and may remove the poor performing channels that are formed by any of the poor performing network couplings indicated in the poor couplings database.

It is noted that the receiving PLC device 104 (e.g., the network coupling selection unit 122) can employ various other techniques for identifying the poor performing network couplings of the receiving PLC device 104 and the transmitting PLC devices 102 and 106. In some embodiments, a subset of the poor performing channels with the least preferred performance can be identified. The receiver couplings and the transmitter couplings associated with the identified subset of poor performing channels may be marked as "unusable" (and may not be used). In another embodiment, a receiver coupling and a transmitter coupling that form each of the poor performing channels can be identified. The receiver coupling and the transmitter coupling that are part of the largest number of poor performing channels may be marked as "unusable" (and may not be used). After identifying the unusable (or poor performing) transmitter/receiver couplings, the flow continues at block 608.

At block 608, a primary receiver coupling for the receiving PLC device is determined. As discussed above with reference to FIG. 3 and blocks 408 and 410 of FIG. 4, the receiving PLC device 104 (e.g., the network coupling selection unit 122) may assign a weight to each unicast communication channel (e.g., each combination of transmitter coupling and receiver coupling). The weight may be assigned based on factors such as, PHY data rate, expected link performance (e.g., throughput), link quality, traffic intensity, Quality-of-Service (QoS) requirements, etc. After the weights are assigned, the primary receiver coupling for the receiving PLC device 104 can be determined.

As discussed above with reference to block 404 of FIG. 4, in some embodiments, the receiving PLC device 104 (e.g., the network coupling selection unit 122) can identify a potential primary TX-RX coupling for receiving unicast traffic from each of the other PLC devices 102 and 106 in the PLC network. In other words, for each transmitting PLC device 102 and 106, the receiving PLC device 104 can identify (for each of the transmitting PLC devices 102 and 106) a preferred communication channel for receiving unicast traffic from the transmitting PLC device. In some embodiments, the receiving PLC device 104 can also identify (for each of the transmitting PLC devices 102 and 106) a next preferred communication channel for receiving unicast traffic from the transmitting PLC device. The next preferred communication channel for receiving unicast traffic from the transmitting PLC device may be a "potential secondary TX-RX coupling" for receiving unicast traffic from the transmitting PLC device. In some embodiments, the receiving PLC device 104 (e.g., the network coupling selection unit 122) can identify the potential primary and secondary TX-RX couplings to maximize the aggregated weight of the primary and secondary TX-RX couplings for receiving unicast traffic from each of the transmitting PLC devices.

After selecting the potential primary and secondary TX-RX couplings (i.e., potential primary and secondary channels) for receiving unicast transmissions from each of the transmitting PLC devices, the receiving PLC device 104 (e.g., the network coupling selection unit 122) can coordinate conflicting potential primary and secondary TX-RX couplings to maximize the aggregated weight of the coordinated TX-RX couplings. Specifically, with reference to the receiving PLC device 104, the receiving PLC device 104 can determine the aggregated weights of all possible combinations between its receiver network couplings and the transmitter network couplings of other transmitting PLC devices in the communication network. The receiving PLC device 104 can coordinate conflicting potential primary and secondary TX-RX couplings to select a single primary receiver coupling for the receiving PLC device 104 such that the aggregated weight is maximized. An example for coordinating the potential primary and secondary TX-RX couplings to select a single primary receiver coupling was described above in FIG. 3. After the primary receiver coupling is selected, the flow continues at block 610.

At block 610, a notification of the selected primary receiver coupling is transmitted to each transmitting PLC device. With reference to the example of FIG. 3, after the receiving PLC device 308 selects the LG network coupling as the primary receiver coupling, the receiving PLC device 308 can transmit a notification to the transmitting PLC devices 302, 304, and 306 in the PLC network. In some embodiments, in addition to notifying of the primary receiver coupling, the receiving PLC device 308 can also determine a secondary receiver coupling for receiving unicast messages from each of the transmitting PLC devices 302, 304, and 306. In some embodiments, the secondary receiver coupling of the receiving PLC device 308 may be different for each of the transmitting PLC devices 302, 304, and 306. In other embodiments, the secondary receiver coupling of the receiving PLC device 308 may be the same for each of the transmitting PLC devices 302, 304, and 306. In some embodiments, the receiving PLC device 308 may transmit a broadcast (or multicast) notification to the PLC devices 302, 304, and 306 to indicate the primary receiver coupling and may then transmit a unicast message to each of the PLC devices 302, 304, and 306 to indicate the corresponding secondary receiver coupling. In other embodiments, the receiving PLC device 308 may transmit a separate unicast message to each of the PLC devices 302, 304, and 306 to indicate the primary receiver coupling and the secondary receiver coupling. As will be further described with reference to FIG. 7, the transmitting PLC device can use its knowledge of the primary and secondary receiver couplings of the receiving PLC device 308 to determine how to communicate with the receiving PLC device 308. From block 610, the flow ends.

It is noted that the transmitting PLC device (e.g., the transmitting PLC device 302 of FIG. 3) can receive the notification of the primary receiver coupling (and the secondary receiver coupling) from the receiving PLC device 308. On receiving this information, the transmitting PLC device 302 can store an indication of the primary and secondary receiver couplings associated with the receiving PLC device 308 (e.g., in a database or another suitable data structure). Likewise, the transmitting PLC device 302 may also receive (and store) indications of the primary and secondary receiver couplings associated with other PLC devices (e.g., the PLC devices 304 and 306) in the PLC network. As will further be described with reference to FIG. 7, when the transmitting PLC device 302 determines to transmit a unicast message to the receiving PLC device 308, the transmitting PLC device 302 can communicate with the receiving PLC device 308 based, at least in part, on a selected preferred communication channel and the primary receiver coupling of the receiving PLC device 308.

It is noted that in some embodiments, the operations described in blocks 604-606 for identifying the unusable transmitter/receiver couplings may be executed for broadcast and multicast communications. In other words, a PLC device 104 may first identify the poor performing transmitter/receiver couplings that may not be used for transmitting or receiving broadcast/multicast communications. After the poor performing network couplings for broadcast/multicast communication are identified, the PLC device 104 (e.g., the network coupling selection unit 122) can identify the primary receiver coupling for receiving unicast traffic, as discussed above with reference to FIGS. 4 and 6. In some embodiments, while selecting the primary receiver coupling for receiving unicast traffic, the PLC device 104 may not consider the poor performing network couplings (and the poor performing channels) for broadcast/multicast communications. In other embodiments, while selecting the primary receiver coupling for receiving unicast traffic, the PLC device 104 may also consider the poor performing network couplings (and the poor performing channels) for broadcast/multicast communications. In this embodiment, the poor performing network couplings may be assigned a less preferred weight to bias against selection of the poor performing network couplings.

Figure 7:
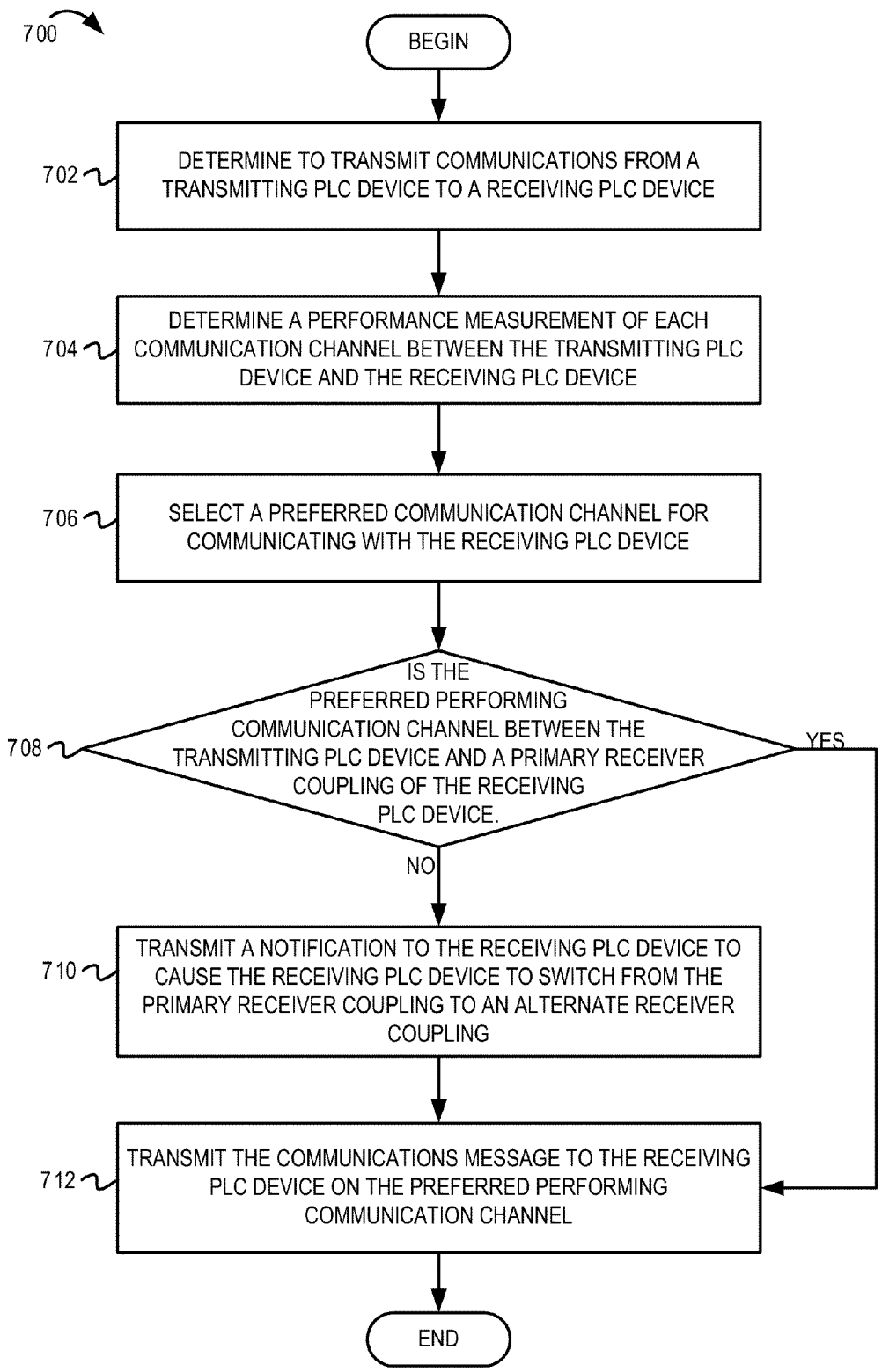
FIG. 7 is a flow diagram illustrating example operations for transmitting communications based, at least in part, on a primary receiver coupling.

FIG. 7 is a flow diagram 700 illustrating example operations for transmitting communications based, at least in part, on a primary receiver coupling. The flow 700 begins at block 702.

At block 702, a transmitting PLC device determines to transmit a message to a receiving PLC device. With reference to the example of FIG. 1, the transmitting PLC device 102 may determine to transmit a message to the receiving PLC device 104. The flow continues at block 704.

At block 704, a performance measurement of each communication channel between the transmitting PLC device and the receiving PLC device is determined. For example, the channel performance estimation unit 110 (of the transmitting PLC device 102) can determine a performance measurement of each communication channel between the transmitting PLC device 102 and the receiving PLC device 104. As discussed above, each communication channel between the PLC devices 102 and 104 can be a combination of a network coupling of the transmitting PLC device 102 and a network coupling of the receiving PLC device 104. Referring to FIG. 2, in one embodiment, there can be four communication channels between the PLC devices 102 and 104, 1) a channel formed by the combination of the LN network coupling 202 and the LN network coupling 206, 2) a channel formed by the combination of the LN network coupling 202 and the LG network coupling 208, 3) a channel formed by the combination of the LG network coupling 204 and the LN network coupling 206, and 4) a channel formed by the combination of the LG network coupling 204 and the LG network coupling 208. The performance measurement can include a signal-to-noise ratio (SNR), a signal strength, a signal-to-interference-and-noise ratio (SINR), an attenuation level, and/or other suitable performance measurements.

In some embodiments, the performance measurement of each communication channel can also take into account, the current primary receiver coupling associated with the receiving PLC device 104. As discussed above with reference to FIGS. 1-6, the receiving PLC device 104 can provide an indication of its current primary receiver coupling to the PLC device 102. The current primary receiver coupling can be a default network coupling on which the receiving PLC device 104 listens for transmissions from other PLC devices. As discussed above, the transmitting PLC device 102 may transmit a coupling switch notification (e.g., a CTS message) to cause the receiving PLC device 104 to receive subsequent messages on an alternate (non-primary) receiver coupling. In some embodiments, when determining the performance measurement of the channels, the transmitting PLC device 102 (e.g., the channel performance estimation unit 110) can take the overhead that may be incurred into consideration. After the performance measurement of each communication channel between the transmitting PLC device and the receiving PLC device are determined, the flow continues at block 706.

At block 706, a preferred communication channel for communicating with the receiving PLC device is selected. In some embodiments, the transmitting PLC device 102 (e.g., the network coupling selection unit 112) can select the communication channel (between the transmitting PLC device 102 and the receiving PLC device 104) associated with the preferred performance measurement. For example, the transmitting PLC device 102 can select the communication channel associated with the highest SNR measurement. The flow continues at block 708.

At block 708, it is determined whether the preferred communication channel is between the transmitting PLC device and the primary receiver coupling associated with the receiving PLC device. For example, if the current primary receiver coupling of the receiving PLC device 104 (determined in FIG. 4) is the LG network coupling 208, the transmitting PLC device 102 (e.g., the network coupling selection unit 112) can determine whether the preferred communication channel (selected at block 706) is formed with the LG network coupling 208. In some embodiments, the transmitting PLC device 102 can determine a receiver coupling associated with the preferred communication channel. The transmitting PLC device 102 can compare the primary receiver coupling against the receiver coupling associated with the preferred communication channel. It is noted that the preferred communication channel may be formed with any network coupling (e.g., the LN network coupling 202 or the LG network coupling 204) of the transmitting PLC device 102. If it is determined that the preferred communication channel is formed with the primary receiver coupling of the receiving PLC device, the flow continues at block 712. Otherwise, if the preferred communication channel is not formed with the primary receiver coupling of the receiving PLC device, the flow continues at block 710.

At block 710, a notification is transmitted to the receiving PLC device to cause the receiving PLC device to switch from the primary receiver coupling to an alternate receiver coupling. The flow 700 moves from block 708 to block 710 if the preferred communication channel is not formed with the primary receiver coupling of the receiving PLC device. In one embodiment, the transmitting PLC device 102 can transmit a coupling switch notification (e.g., a CTS message) to the primary receiver coupling of receiving PLC device 104. The coupling switch notification can include a request to the receiving PLC device 104 to switch to an alternate receiver coupling to receive subsequent communications from the transmitting PLC device 102. In some embodiments, the transmitting PLC device 102 can also provide (e.g., in the coupling switch notification) an indication of the receiver coupling associated with the preferred communication channel. The flow continues at block 712.

At block 712, the communications are transmitted to the receiving PLC device on the preferred communication channel. The flow 700 moves from block 708 to block 712 if the preferred communication channel is formed with the primary receiver coupling of the receiving PLC device 104. In this embodiment, the transmitting PLC device 102 can transmit the communications to the primary receiver coupling of the receiving PLC device 104. The flow 700 also moves from block 710 to block 712 after transmitting a coupling switch notification to cause the receiving PLC device 104 to switch to an alternate receiver network coupling. In some embodiments, the transmitting PLC device 102 can wait to receive an acknowledgement message from the receiving PLC device 104 that indicates that the receiving PLC device 104 has switched to the alternate receiver coupling. The transmitting PLC device 102 can transmit the communications after the receiving PLC device 104 couples with the alternate network coupling. In another embodiment, the transmitting PLC device 102 may not wait to receive an acknowledgement. Instead, the transmitting PLC device 102 can wait for a predetermined time interval before transmitting the communications to the receiving PLC device 104. From block 712, the flow ends.

It should be understood that FIGS. 1-7 and the operations described herein are examples meant to aid in understanding embodiments and should not be used to limit embodiments or limit scope of the claims. Embodiments may perform additional operations, fewer operations, operations in a different order, operations in parallel, and some operations differently. It is noted that although FIGS. 2 and 3 describe a mechanism for adaptive transmitter-receiver coupling selection in a two-device and a three-device environment, respectively, embodiments are not so limited. In other embodiments, the PLC network 100 can comprise any suitable number of PLC devices. Each PLC device can execute the operations described above to select a primary receiver coupling on which the PLC device listens for unicast traffic from all of the other PLC devices in the PLC network. Each PLC device scheduled to transmit a message can also execute operations described herein to identify a preferred PLC channel and to determine whether to transmit a coupling switch notification based on the preferred PLC channel and the primary receiver coupling of the receiving PLC device.

It is noted that each PLC device in the PLC network can execute the primary receiver coupling selection operations described above in FIGS. 1 (stages A-C) and 2-6 periodically or in accordance with a predetermined schedule to ensure that the current primary receiver coupling yields a preferred performance of the PLC device. For example, the PLC device 308 may execute the primary receiver coupling selection operations and may select the LG network coupling 324 as the current primary receiver coupling. As the channel conditions change, the PLC device 308 may re-execute the primary receiver coupling selection operations and may select the LN network coupling 322 as the current primary receiver coupling.

In some embodiments, each PLC device can periodically (or in accordance with a predetermined schedule) execute the operations described above in blocks 604 and 606 of FIG. 6 for identifying and eliminating poor performing network couplings and/or poor performing channels. As discussed above, the PLC devices may not use the identified poor performing transmitter and receiver couplings and/or the poor performing channels for communicating broadcast and multicast data. In some embodiments, the PLC devices may not use the poor performing transmitter and receiver couplings and/or the poor performing channels for communicating unicast data. In other embodiments, the PLC devices may take the poor performing transmitter and receiver couplings into consideration when selecting the primary and secondary receiver couplings.

It is noted that each PLC device may also identify a transmitter network coupling for transmitting broadcast and/or multicast communications. In some embodiments, the PLC device can execute operations described above in blocks 604 and 606 of FIG. 6 to identify and discard poor performing channels and network couplings. The PLC device can select a preferred transmitter network coupling for transmitting broadcast/multicast transmissions based, at least in part, on performance measurements of each communication channel between each pair of PLC devices in the PLC network. For example, after discarding the poor performing channels and/or network couplings, the PLC device 102 can select a transmitter network coupling that provides the highest communication reliability as the preferred transmitter network coupling. In some embodiments, the PLC device 102 may transmit the broadcast (or multicast) messages only from the preferred transmitter network coupling. The receiving PLC devices may receive the broadcast (or multicast) messages via their respective primary receiver coupling. In other embodiments, the PLC device 102 can transmit the broadcast (or multicast) from all of its network couplings (e.g., via the LN transmitter network coupling and the LG transmitter network coupling). In some embodiments, prior to transmitting the broadcast (or multicast) message, the PLC device can broadcast a notification indicating that receiving PLC devices should switch to a specified receiver coupling to receive subsequent broadcast (or multicast) messages.

In some embodiments, before transmitting the coupling switch notification at block 610 of FIG. 6, the transmitting PLC device 102 may determine whether to transmit the coupling switch notification to the receiving PLC device 104. For this, the transmitting PLC device 102 may determine whether the performance measurement of a communication channel formed with the primary receiver coupling is within a predetermined threshold of the performance measurement of the preferred communication channel (formed with an alternate receiver coupling). For example, in addition to the preferred communication channel, the transmitting PLC device 102 may identify a best-performing communication channel formed with the primary receiver coupling of the receiving PLC device 104 and any network coupling of the transmitting PLC device 102. The transmitting PLC device 102 may compare the performance measurement of the preferred communication channel (formed with the alternate receiver coupling) with the performance measurement of the best-performing communication channel formed with the primary receiver coupling. For example, if the SNR (or throughput) achieved on the preferred communication channel is within a predetermine threshold or a predetermined percentage (e.g., 5%) of the SNR (or throughput) of the best-performing communication channel formed with the primary receiver coupling, the transmitting PLC device 102 may determine not to transmit the coupling switch notification. Instead, the transmitting PLC device 102 may infer that a substantial performance gain is not achieved by prompting the receiving PLC device 104 to switch to the alternate receiver coupling and may transmit the communications to the primary receiver coupling of the receiving PLC device 104.

In some embodiments, some of the PLC devices in the PLC network may not be configured to execute operations (described above in FIGS. 1-7) to dynamically select a primary receiver coupling. These PLC devices may be referred to as "legacy PLC devices." In this embodiment, a non-legacy transmitting PLC device that is configured to execute the operations described above may select the preferred transmitter coupling taking into consideration the static primary receiver coupling of a receiving legacy PLC device. For example, the receiver coupling of the receiving legacy PLC device may be the LN network coupling. Accordingly, the transmitting PLC device may compare the performance of the LG-LN TX-RX coupling and the LN-LN TX-RX coupling. If the transmitting PLC device determines that the performance of the LG-LN channel is better than that of the LN-LN channel, the transmitting PLC device may transmit the unicast message to the legacy PLC device from the LG transmitter coupling. In another embodiment, while selecting the transmitter network coupling, the transmitting PLC device can take into consideration the performance of all the communication channels for communicating with the receiving legacy PLC device and the overhead that may be incurred to cause the receiving legacy PLC device to switch from the static primary receiver coupling.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C"-programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
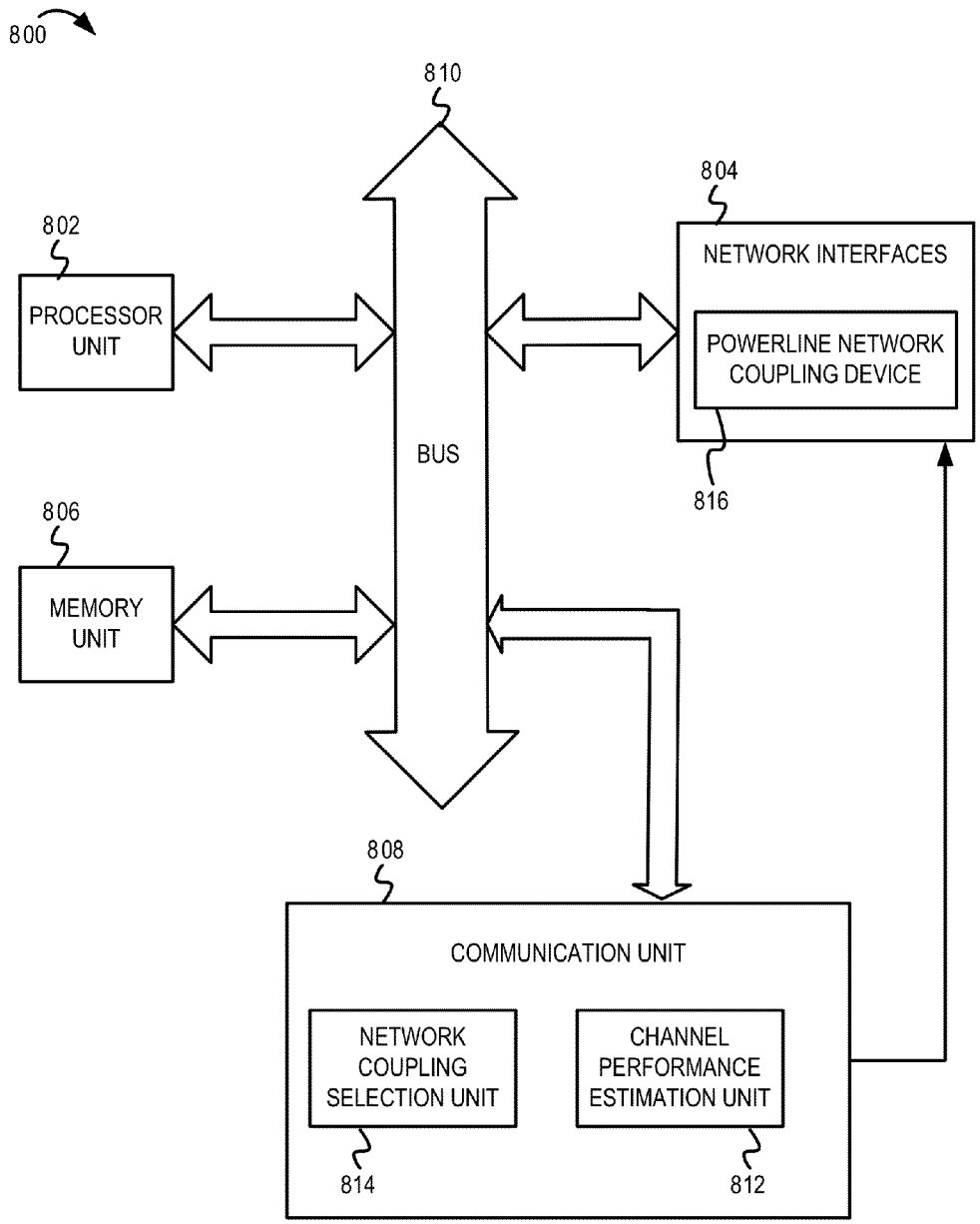
FIG. 8 is a block diagram of one embodiment of an electronic device including a mechanism for exploiting selection diversity for powerline communications.

FIG. 8 is a block diagram of one embodiment of an electronic device 800 including a mechanism for exploiting selection diversity for powerline communications. In some implementations, the electronic device 800 may be a laptop computer, a tablet computer, a netbook, a mobile phone, a smart appliance, a gaming console, a desktop computer, or other electronic systems configured to communicate across a powerline communication network. In other implementations, the electronic device 800 can be a dedicated powerline communication device, such as a powerline adapter. The electronic device 800 includes a processor unit 802 (possibly including multiple processors, multiple cores, multiple nodes, and/or implementing multi-threading, etc.). The electronic device 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 800 also includes a bus 810 (e.g., PCI, ISA, PCI-Express, HyperTransport®, Infini-Band®, NuBus, AHB, AXI, etc.), and network interfaces 804 that include one or more of a wired network interface (e.g., a powerline communication interface) and a wireless network interface (e.g., a WLAN interface, a Bluetooth® interface, a WiMAX interface, a ZigBee® interface, a Wireless USB interface, etc.). The network interfaces 804 also comprise a powerline network coupling device 816. In some embodiments, the powerline network coupling device 816 can be implemented as part of a PLC interface of the electronic device 800. It is also noted that in some embodiments, the network interface 804 may only comprise a PLC interface. In other embodiments, however, the network interface 804 can comprise any suitable number and types of network interfaces, in addition to the PLC interface.

The electronic device 800 also comprises a communication unit 808. The communication unit 808 comprises a channel performance estimation unit 812 and a network coupling selection unit 814. The communication unit 808 is coupled with the network interfaces 804 (e.g., the powerline network coupling device 816). The communication unit 808 can implement functionality to dynamically select a current primary receiver coupling based on channel conditions between the electronic device 800 and other network devices in the communication network, as described above with reference to FIGS. 1-6. The communication unit 808 can also execute functionality to determine how to communicate with a receiving network device based, at least in part, on a preferred communication channel (between the receiving network device and the electronic device 800) and a primary receiver coupling of the receiving network device, as described with reference to FIG. 7. In some embodiments, the powerline network coupling device 816 can receive a notification from the communication unit 808 (e.g., the network coupling selection unit 814) identifying the desired network coupling of the electronic device 800. The powerline network coupling device 816 in conjunction with the PLC interface can couple the electronic device 800 to a powerline medium via the appropriate network coupling selected by the network coupling selection unit 814.

In some embodiments, the communication unit 808 may include components that implement wired/wireless communication in the same integrated circuit (e.g., a system-on-a-chip) or in the same circuit board within the electronic device 800. For example, the communication unit 808 can include a one or more additional processors (that are distinct from the processor unit 802 coupled with the bus 810), powerline modem, a WLAN modem, a Bluetooth modem, and/or other suitable components. Furthermore, one or more components of the communication unit 808 can be implemented on a common chip or integrated circuit, on separate chips and then coupled together, etc. Any one of these functionalities may be partially (or entirely) implemented in hardware and/or on the processor unit 802. For example, the functionality may be implemented with an application specific integrated circuit, in logic implemented in the processor unit 802, in a co-processor on a peripheral device or card, etc. Further, realizations may include fewer or additional components not illustrated in FIG. 8 (e.g., video cards, audio cards, additional network interfaces, peripheral devices, etc.). The processor unit 802, the memory unit 806, and the network interfaces 806 are coupled to the bus 810. Although illustrated as being coupled to the bus 810, the memory unit 806 may be coupled to the processor unit 802.

While the embodiments are described with reference to various implementations and exploitations, it will be understood that these embodiments are illustrative and that the scope of the inventive subject matter is not limited to them. In general, techniques for exploiting selection diversity in a powerline communication system as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for network coupling selection, the method comprising:
   determining, at a first network device, performance measurements associated with communication channels between the first network device and each of a plurality of transmitting network devices;

determining, at the first network device, potential primary receiver couplings of the first network device for receiving communications from the plurality of transmitting network devices based, at least in part, on the performance measurements associated with the communication channels; and selecting a primary receiver coupling for the first network device from the potential primary receiver couplings.

2. The method of claim 1, wherein, for each of the plurality of transmitting network devices, a performance measurement associated with the communication channels between the first network device and the transmitting network device is determined based, at least in part, on a message received from the transmitting network device via the communication channels.

3. The method of claim 1, wherein,
the communication channels are powerline communication (PLC) channels, and
the first network device and each of the plurality of transmitting network devices comprise a line-neutral (LN) network coupling and a line-ground (LG) network coupling.

4. The method of claim 1, wherein,
for each of the plurality of transmitting network devices, each of the communication channels between the first network device and the transmitting network device comprises a network coupling of the first network device and a network coupling of the transmitting network device.

5. The method of claim 1, further comprising:
transmitting a notification message to the plurality of transmitting network devices to indicate the primary receiver coupling of the first network device.

6. The method of claim 1, wherein said determining the potential primary receiver couplings of the first network device comprises:
for each of the plurality of transmitting network devices,
determining, at the first network device, a first communication channel for receiving the communications from the transmitting network device based, at least in part, on the performance measurements associated with the communication channels; and
determining a potential primary receiver coupling based, at least in part, on a first network coupling of the first network device that is associated with the first communication channel.

7. The method of claim 6, further comprising:
for each of the plurality of transmitting network devices,
determining, at the first network device, a second communication channel for receiving the communications from the transmitting network device based, at least in part, on the performance measurements associated with the plurality of communication channels; and
determining a secondary receiver coupling of the first network device based, at least in part, on a second network coupling of the first network device that is associated with the second communication channel.

8. The method of claim 1, further comprising determining that the potential primary receiver couplings are not the same for the plurality of transmitting network devices in response to:
determining, at the first network device, that a first network coupling is selected as a potential primary receiver coupling for a first transmitting network device of the plurality of transmitting network devices; and
determining, at the first network device, that a second network coupling is selected as a potential primary receiver coupling for a second transmitting network device of the plurality of transmitting network devices.

9. The method of claim 1, wherein said selecting the primary receiver coupling comprises:
determining whether the potential primary receiver couplings are the same for the plurality of transmitting network devices;
in response to determining that the potential primary receiver couplings are the same,
selecting any one of the potential primary receiver couplings as the primary receiver coupling for the first network device.

10. The method of claim 1, wherein said selecting the primary receiver coupling comprises:
determining whether the potential primary receiver couplings are the same for the plurality of transmitting network devices;
in response to determining that the potential primary receiver couplings are not the same,
selecting a potential primary receiver coupling as the primary receiver coupling for the first network device.

11. The method of claim 10, further comprising:
assigning weights to the potential primary receiver couplings; and
selecting the potential primary receiver coupling based, at least in part, on the assigned weights.

12. The method of claim 11, wherein, for each of the plurality of transmitting network devices, said assigning the weights comprises assigning a weight to a potential primary receiver coupling based, at least in part, on at least one member of the group consisting of a performance measurement of at least one communication channel formed by the potential primary receiver coupling and a traffic load associated with the transmitting network device.

13. The method of claim 1, further comprising:
determining that a first communication channel between the first network device and a first transmitting network device is associated with a first network coupling of the first network device; and
determining not to exchange communications with the first transmitting network device via the first network coupling based, at least in part, on a performance measurement associated with the first communication channel.

14. The method of claim 1, further comprising:
for each of the communication channels,
determining whether a performance measurement of the communication channel is less than a performance measurement threshold; and
in response to determining the performance measurement of the communication channel is less than the performance measurement threshold, determining not to receive communications from the plurality of transmitting network devices via a first network coupling of the first network device that is associated with the communication channel.

15. The method of claim 14, further comprising:
in response to determining the performance measurement of the communication channel is less than the performance measurement threshold,
determining not to transmit broadcast communications or multicast communications from the first network coupling.

16. The method of claim 14, further comprising:
in response to determining the performance measurement of the communication channel is less than the performance measurement threshold, determining not to select the first network coupling as the primary receiver coupling.

17. The method of claim 1, further comprising:
receiving, at the first network device, an indication of a primary receiver coupling of a second network device;
determining, at the first network device, a first communication channel for communicating with the second network device based, at least in part, on performance measurements of communication channels between the second network device and the first network device; and
determining whether to communicate with the primary receiver coupling of the second network device based, at least in part, on whether the first communication channel is associated with the primary receiver coupling of the second network device.

18. The method of claim 17, further comprising:
in response to determining the first communication channel is associated with the primary receiver coupling of the second network device,
transmitting a message on the first communication channel to the primary receiver coupling of the second network device; and
in response to determining the first communication channel is not associated with the current primary receiver coupling of the second network device,
transmitting a coupling switch notification to the second network device to switch from the primary receiver coupling to an alternate receiver coupling; and
transmitting a message on the first communication channel to the alternate receiver coupling.

19. The method of claim 1, further comprising:
periodically evaluating the performance measurements of the communication channels between the first network device and each of the plurality of transmitting network devices to determine whether to select a new primary receiver coupling.

20. A method for determining network couplings for network communication comprising:
determining, at a first network device, a first communication channel for communicating with a second network device based, at least in part, on performance measurements of communication channels between the second network device and the first network device;
determining, at the first network device, a primary receiver coupling of the second network device;
determining, at the first network device, that the first communication channel is associated with an alternate receiver coupling of the second network device; and
transmitting a notification message to the second network device to switch from the primary receiver coupling to the alternate receiver coupling.

21. The method of claim 20, further comprising:
transmitting a message to the second network device via the first communication channel after the second network device switches from the primary receiver coupling to the alternate receiver coupling.

22. The method of claim 20, further comprising:
receiving, at the first network device, an indication of the primary receiver coupling of the second network device.

23. The method of claim 20, further comprising, in response to said determining that the first communication channel is associated with the alternate receiver coupling, determining whether to transmit the notification message to the second network device based, at least in part, on at least one member of the group consisting of a performance measurement of the first communication channel, a performance measurement of at least one communication channel formed by the alternate receiver coupling, and an overhead associated with transmitting the notification message to the second network device.

24. The method of claim 20, further comprising:
transmitting a message to the second network device via the first communication channel after receiving an acknowledgement message from the second network device that indicates the second network device has switched to the alternate receiver coupling.

25. A first network device comprising:
a processor;
a channel performance estimation unit coupled with the processor, the channel performance estimation unit configured to:
determine performance measurements associated with communication channels between the first network device and each of a plurality of transmitting network devices; and
a network coupling selection unit coupled with the processor, the network coupling selection unit configured to:
determine potential primary receiver couplings of the first network device for receiving communications from the plurality of transmitting network devices based, at least in part, on the performance measurements associated with the communication channels; and
select a primary receiver coupling for the first network device from the potential primary receiver couplings.

26. The first network device of claim 25, wherein the network coupling selection unit is further configured to:
transmit a notification message to the plurality of transmitting network devices to indicate the primary receiver coupling of the first network device.

27. The first network device of claim 25, wherein the network coupling selection unit is further configured to:
for each of the plurality of transmitting network devices,
determine, at the first network device, a first communication channel for receiving the communications from the transmitting network device based, at least in part, on the performance measurements associated with the communication channels; and
determine a potential primary receiver coupling based, at least in part, on a first network coupling of the first network device that is associated with the first communication channel.

28. The first network device of claim 25, wherein the network coupling selection unit is further configured to:
assign weights to the potential primary receiver couplings; and
select one of the potential primary receiver couplings as the primary receiver coupling of the first network device based, at least in part, on the assigned weights.

29. The first network device of claim 25, wherein the network coupling selection unit is further configured to:
for each of the communication channels,
determine whether a performance measurement of the communication channel is less than a performance measurement threshold; and
in response to determining the performance measurement of the communication channel is less than the performance measurement threshold, determine not to receive communications from the plurality of transmitting network devices via a first network coupling of the first network device that is associated with the communication channel.

30. The first network device of claim 29, wherein the network coupling selection unit is further configured to:
  in response to determining the performance measurement of the communication channel is less than the performance measurement threshold,
    determine not to transmit broadcast communications or multicast communications from the first network coupling.

31. The first network device of claim 25, wherein the network coupling selection unit is further configured to:
  determine a first communication channel for communicating with a second network device based, at least in part, on performance measurements of communication channels between the second network device and the first network device;
  determine a primary receiver coupling of the second network device;
  determine that the first communication channel is associated with an alternate receiver coupling of the second network device; and
  transmit a notification message to the second network device to switch from the primary receiver coupling to the alternate receiver coupling.

32. A non-transitory machine-readable storage media having machine executable instructions stored therein, the machine executable instructions comprising instructions to:
  determine performance measurements associated with communication channels between a first network device and each of a plurality of transmitting network devices,
  determine potential primary receiver couplings of the first network device for receiving communications from the plurality of transmitting network devices based, at least in part, on the performance measurements associated with the communication channels; and
  select a primary receiver coupling for the first network device from the potential primary receiver couplings.

33. The non-transitory machine-readable storage media of claim 32, wherein said instructions to determine the potential primary receiver couplings of the first network device comprise instructions to:
  for each of the plurality of transmitting network devices,
    determine a first communication channel for receiving the communications from the transmitting network device based, at least in part, on the performance measurements associated with the communication channels; and
    determining a potential primary receiver coupling based, at least in part, on a first network coupling of the first network device that is associated with the first communication channel.

34. The non-transitory machine-readable storage media of claim 32, wherein said instructions to select the primary receiver coupling comprise instructions to:
  assign weights to the potential primary receiver couplings; and
  select one of the potential primary receiver couplings as the primary receiver coupling of the first network device based, at least in part, on the assigned weights.

35. The non-transitory machine-readable storage media of claim 32, wherein said instructions further comprise instructions to:
  for each of the communication channels,
    determine whether a performance measurement of the communication channel is less than a performance measurement threshold; and
    in response to determining the performance measurement of the communication channel is less than the performance measurement threshold, determine not to receive communications from the plurality of transmitting network devices via a first network coupling of the first network device that is associated with the communication channel.

36. The non-transitory machine-readable storage media of claim 35, wherein said instructions further comprise instructions to:
  in response to determining the performance measurement of the communication channel is less than the performance measurement threshold,
    determine not to transmit broadcast communications or multicast communications from the first network coupling.

37. The non-transitory machine-readable storage media of claim 32, wherein said instructions further comprise instructions to:
  determine a first communication channel for communicating with a second network device based, at least in part, on performance measurements of communication channels between the second network device and the first network device;
  determine a primary receiver coupling of the second network device;
  determine that the first communication channel is associated with an alternate receiver coupling of the second network device; and
  transmit a notification message to the second network device to switch from the current primary receiver coupling to the alternate receiver coupling.

* * * * *